US006615767B1

(12) United States Patent
Untermeyer et al.

(10) Patent No.: US 6,615,767 B1
(45) Date of Patent: Sep. 9, 2003

(54) AQUACULTURE METHOD AND SYSTEM FOR PRODUCING AQUATIC SPECIES

(75) Inventors: Thomas C. Untermeyer, Lakehills, TX (US); Bill G. Williams, Waco, TX (US); Gerald Easterling, Carrollton, TX (US)

(73) Assignee: Automated Shrimp Corporation, San Antonio, TX (US)

( * ) Notice: Subject to any disclaimer, the term of this patent is extended or adjusted under 35 U.S.C. 154(b) by 0 days.

(21) Appl. No.: 09/683,798

(22) Filed: Feb. 15, 2002

(51) Int. Cl.[7] .............................................. A01K 61/00
(52) U.S. Cl. ...................................................... 119/215
(58) Field of Search ................................. 119/215, 200, 119/217, 234, 236, 242

(56) References Cited

U.S. PATENT DOCUMENTS

| | | | | |
|---|---|---|---|---|
| 4,137,868 A | * | 2/1979 | Pryor | 119/212 |
| 5,040,486 A | * | 8/1991 | Pack | 119/215 |
| 5,144,907 A | * | 9/1992 | Dabinett | 119/236 |
| 5,216,976 A | | 6/1993 | Marinkovich | |
| 5,353,745 A | | 10/1994 | Fahs, II | |
| 5,692,455 A | * | 12/1997 | Wang | 119/242 |
| 5,811,007 A | | 9/1998 | Stewart et al. | |
| 5,820,759 A | | 10/1998 | Stewart et al. | |
| 6,103,225 A | * | 8/2000 | Barclay | 424/93.1 |
| 6,443,097 B1 | * | 9/2002 | Zohar et al. | 119/217 |

OTHER PUBLICATIONS

Aqua Technologies Group, Inc., Marine Shrimp Cultivation Machines, from website: aquatechgroup.com.
Aqua Technologies Group, Inc., Factory Shrimp Farming, Technical Issues/Yuan–Lin Laboratory, from website: aquatechgroup.com.

* cited by examiner

*Primary Examiner*—Charles T. Jordan
*Assistant Examiner*—Judith A. Nelson
(74) *Attorney, Agent, or Firm*—Taylor Russell & Russell, P.C.

(57) ABSTRACT

The invention provides a method and system for producing aquatic specie for consumer consumption within a closed aquaculture system. It provides for growing algae in artificial saltwater under controlled conditions in an algae subsystem, flowing the algae to an artemia subsystem containing adult artemia for feeding the adult artemia which produce smaller artemia, and flowing the algae and artemia to an aquatic specie subsystem containing an immature adult specie. As the immature aquatic specie consumes the algae and artemia, they mature into adult aquatic specie for harvesting. The invention also includes a data acquisition and control subsystem for automated control of the aquaculture system. A unique filtration subsystem accepts waste from the aquatic specie subsystem, pumps the waste through a series of filters, and returns the filtered saltwater to the algae subsystem, the artemia subsystem and the aquatic specie subsystem.

50 Claims, 12 Drawing Sheets

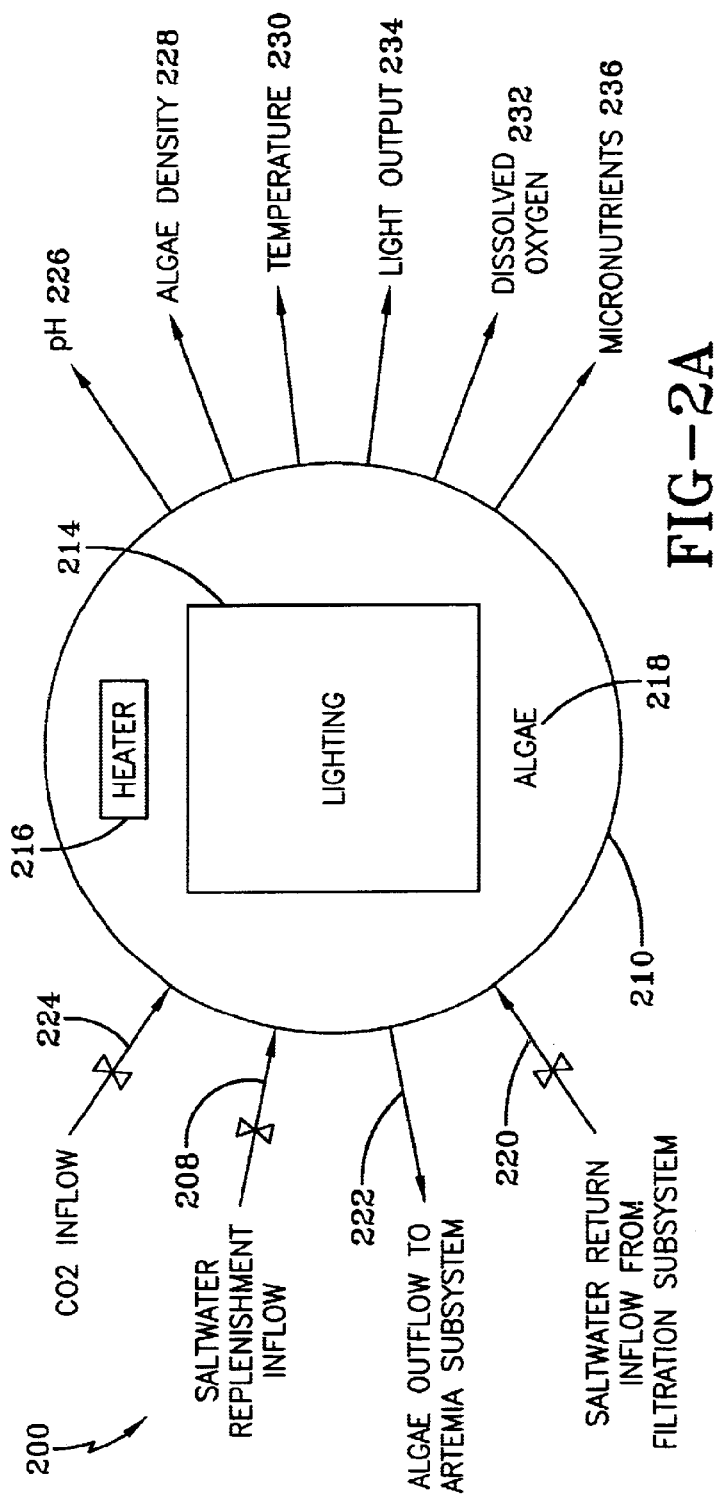
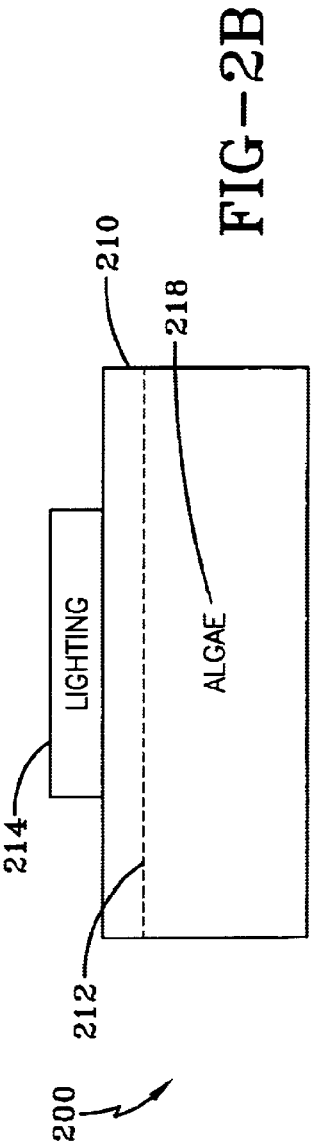
FIG-2A
FIG-2B

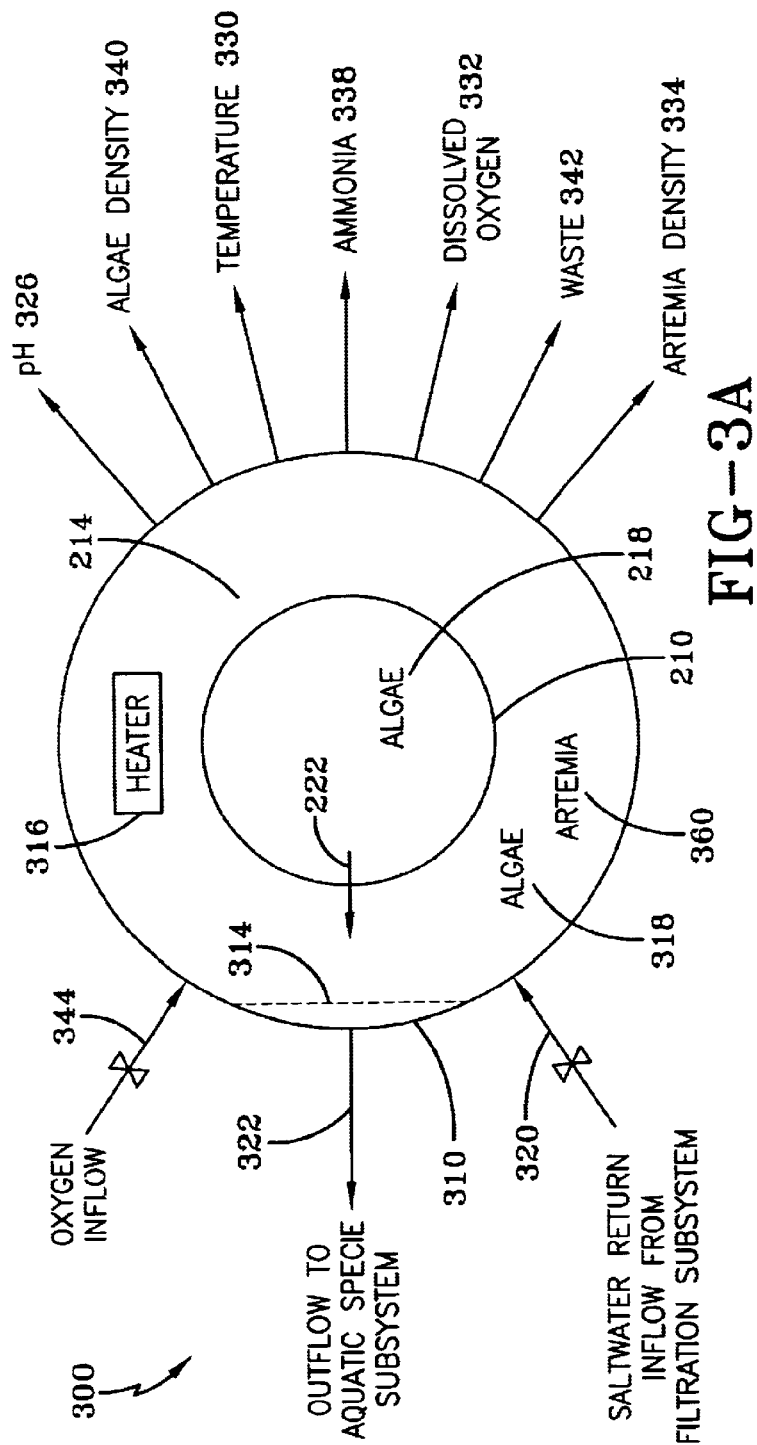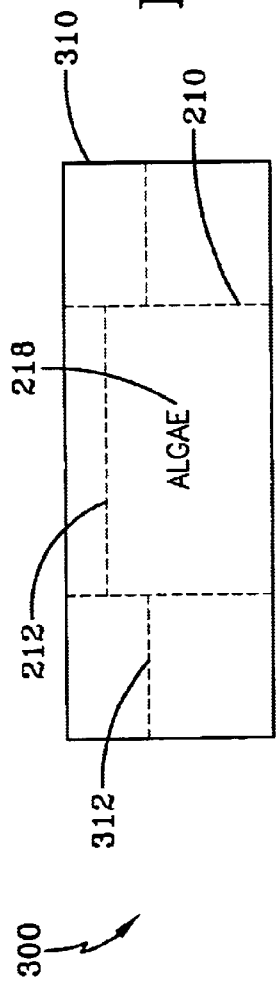

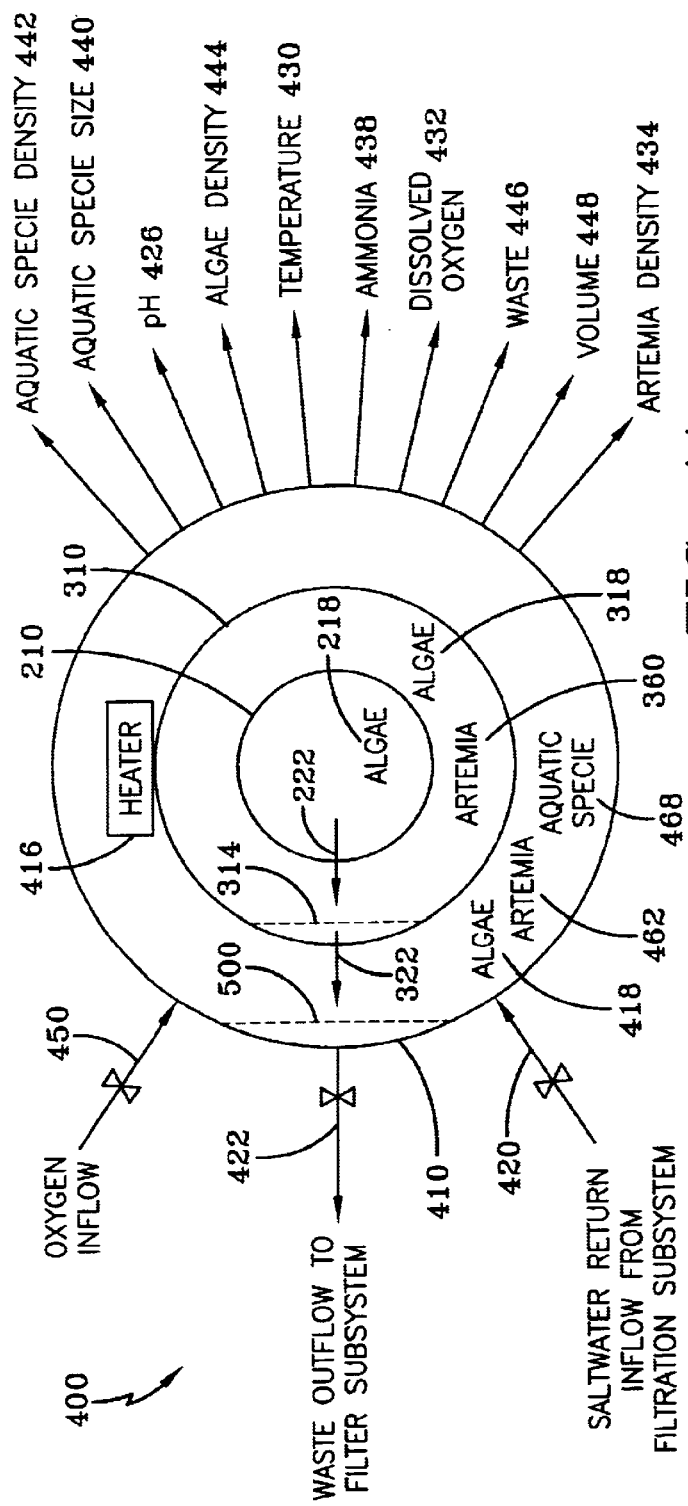
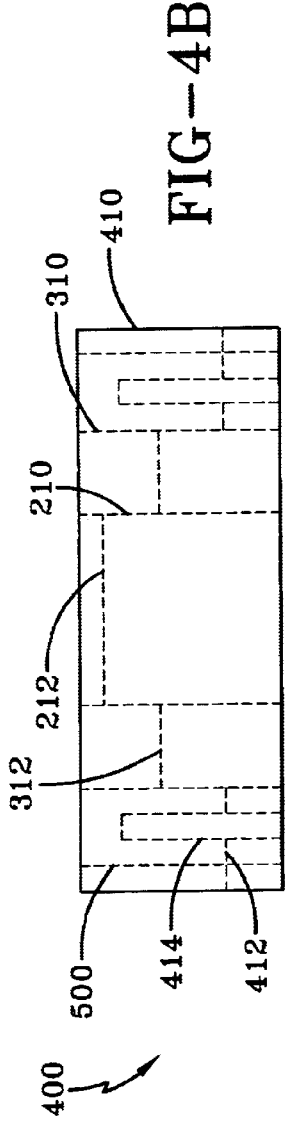
FIG-4A
FIG-4B

AQUACULTURE METHOD AND SYSTEM FOR PRODUCING AQUATIC SPECIES

BACKGROUND OF INVENTION

The invention relates generally to the field of aquaculture and, more particularly, to a system and method for producing aquatic species for consumer consumption. Although the invention relates to a method and system for producing many aquatic specie, the preferred embodiments disclose a method and system for producing shrimp.

While seafood has always been a staple in the diets of many people in the United States and elsewhere, it wasn't until the 1980s that a significant increase in seafood consumption occurred. The consumption was largely the result of an increased awareness of the medical evidence that supported the health benefits and longevity accrued from a seafood diet. As a result, seafood distributors provided a greater abundance and selection of seafood products that further increased consumption. This increased domestic demand coupled with increased international demand by an expanding population led to more efficient methods for harvesting naturally occurring fish stocks from the oceans of the world. The increasingly efficient methods resulted in rapid depletion of these native fish stocks, requiring government intervention to impose restrictions on the size of the total harvest to preserve populations of certain native species. The smaller harvests resulted in increasing the price of seafood products, which helped stimulate the search for methods of growing fish stocks in a controlled artificial environment. The production of catfish in catfish farms is a dominant example of the growing, large-scale aquaculture industry. Other species produced by the aquaculture industry include crayfish, oysters, shrimp, Tilapia and Striped Bass.

The United States consumes about one billion of the approximately seven billion pounds of shrimp that are consumed annually by the world population. While seventy-five percent of this annual harvest is provided by ocean trawling, aquaculture in the form of shrimp farms provide the other twenty five percent. However, ocean trawling suffers from a limited season, a declining catch rate and environmental concerns. Shrimp farms may be categorized as open systems and closed systems.

Open system shrimp farms are generally open to the environment, such as open-air ponds constructed near oceans to contain and grow shrimp. These open shrimp farms suffer from vagaries of predators, the weather, diseases and environmental pollution. Saltwater from the ocean must be continually circulated through the ponds and back to the ocean to maintain adequate water chemistry for the shrimp to grow. The shrimp farmers must supply daily additions of dry food pellets to the shrimp as they grow.

Closed shrimp farms are generally self-contained aquaculture systems. While figs closed shrimp farms have greater control over the artificial environment contained therein, they have not been entirely satisfactory because of limited production rates, water filtration and treatment problems, and manufactured feed. Although some of these shortcomings can be overcome by increased capital expenditures, such as for water treatment facilities, the increased capital, labor and energy costs may be prohibitive.

It is desirable, therefore, to have a method and system for producing aquatic species, and particularly shrimp, that are not limited by a season, declining catch rate, environmental concerns, predators, weather, diseases, low production rates, water treatment problems, or manufactured feed. The system and method should not be limited to a specific location for access to a shipping facility or proximity to the ocean.

SUMMARY OF INVENTION

The present invention provides a closed aquaculture system and method for producing aquatic specie and other aquatic species that is not limited by the seasons of the year, is not limited by a declining catch rate, does not exhibit environmental concerns and is not affected by predators, weather, or diseases. The present invention provides high production rates, does not exhibit water treatment or manufactured feed problems, and is not limited to a specific location for access to a shipping facility or proximity to the ocean. Use of automation results in reduced labor costs and greater system density.

Unlike existing systems and methods, the present invention replicates a natural biological cycle by combining live algae, live artemia and live aquatic specie in a controlled environment. This combination of algae, artemia and aquatic specie stabilizes key system parameters. In addition, the system can achieve higher algae, artemia and aquatic specie density than existing systems by using automation to continually monitor and modify the saltwater environment.

A method having features of the present invention comprises a method for producing adult aquatic specie in an aquaculture system that comprises growing algae within an algae subsystem containing saltwater illuminated by a light source, flowing the algae from the algae subsystem into an artemia subsystem and an aquatic specie subsystem, both containing saltwater, consuming the algae and producing artemia by adult artemia within the artemia subsystem, passing the artemia from the artemia subsystem to the aquatic specie subsystem, consuming algae and the artemia by an immature aquatic specie for producing an adult aquatic specie within the aquatic specie subsystem, and harvesting the adult aquatic specie. The method may further comprise filtering a waste outflow from the aquatic specie subsystem by a filtration subsystem for providing a saltwater return to the algae subsystem, the artemia subsystem, and the aquatic specie subsystem. The method may further comprise controlling the aquaculture system with a data acquisition and control subsystem. The method may further comprise replenishing saltwater lost in the aquaculture system due to evaporation and leakage.

The step of growing algae within an algae subsystem may comprise seeding a selected strain of algae into the algae subsystem containing saltwater, illuminating the algae subsystem with light for proper algae growth, maintaining a temperature of the algae and saltwater by a heater means, measuring pH, algae density, temperature, light output, dissolved oxygen and nitrates, and controlling $CO_2$ inflow, saltwater replenishment inflow, saltwater return inflow from a filtration subsystem, and algae outflow to the artemia subsystem. The selected strain of algae may be selected from the group consisting of isochrysis galbana, skeletonema, thalassiosira, phaeodactylum, chaetoceros, cylindrotheca, tetraselmis and spirulina. The temperature value may be maintained within the range of from 27° C. to 32° C. Controlling a $CO_2$ inflow value may maintain the pH value within a range of from 7.5 to 8.5. The saltwater return inflow value may be selected to maintain an algae density value within a range of from 1 to 10 million cells per milliliter. The saltwater replenishment inflow salinity value may be maintained within a range of from 30 to 35 parts per thousand.

The step of consuming algae and producing artemia by adult artemia within the artemia subsystem may comprise adding artemia to the artemia subsystem containing saltwater for consuming algae and producing artemia, maintaining a temperature of the artemia, algae and saltwater by a heater means, measuring waste, algae density, artemia density, temperature, pH, ammonia, and dissolved oxygen, and controlling oxygen inflow, saltwater return inflow from a filtration subsystem, saltwater replenishment inflow, and artemia outflow to the aquatic specie subsystem. The temperature value may be maintained within the range of from 27° C. to 32° C. The controlling an oxygen inflow value may maintain the dissolved oxygen value within a range of from 4.5 parts per million to 9.0 parts per million. The controlling a saltwater return inflow value may maintain an artemia outflow value to the aquatic specie subsystem to adequately remove waste from the artemia subsystem and provide sufficient artemia to the aquatic specie subsystem for food. The saltwater replenishment inflow salinity value may be maintained within a range of from 30 to 35 parts per thousand. The preferred artemia specie originate from the Great Salt Lake in Utah, USA. The step of passing the artemia from the artemia subsystem to an aquatic specie subsystem may comprise filtering the artemia outflow from the artemia subsystem through a 400 micron screen to prevent adult artemia from leaving the artemia subsystem and allowing artemia waste and smaller artemia to pass to the aquatic specie subsystem.

The step of consuming algae and the artemia by an immature aquatic specie may comprise placing the immature aquatic specie in the aquatic specie subsystem for consuming algae and artemia for producing adult aquatic specie, maintaining a temperature of the aquatic specie, algae, artemia and saltwater by a heater means, measuring volume, waste, algae density, artemia density, aquatic specie size, aquatic specie density, temperature, pH, ammonia, and dissolved oxygen, and controlling oxygen inflow, saltwater return inflow from a filtration subsystem, saltwater replenishment inflow, nauplii inflow from the artemia subsystem, and waste outflow to the filtration subsystem. The step of controlling the waste outflow to the filtration subsystem may comprise filtering the waste outflow from the aquatic specie subsystem through a graded screen to prevent aquatic specie and artemia from leaving the aquatic specie subsystem and allowing waste products to pass to the filtration subsystem. The graded filter screen may comprise a 400 micron bottom section, an 800 micron lower middle section, a 2000 micron upper middle section, and a 5000 micron top section for enabling disposal of increased waste products from increasing size aquatic specie as the effective volume of the aquatic subsystem is increased by increasing a saltwater level to accommodate the larger specie size. The temperature value may maintained within the range of from 27° C. to 32° C. The controlling an oxygen inflow value may maintain the dissolved oxygen value within a range of from 4.5 parts per million to 9.0 parts per million. The controlling a saltwater return inflow value may maintain a waste outflow value to the filtration subsystem by controlling volume to adequately remove waste from the aquatic specie subsystem. The saltwater replenishment inflow salinity value may be maintained within a range of from 30 to 35 parts per thousand. The preferred aquatic specie may be selected from the group consisting of litopenaeus vannamei, monodon, indicus, stylirostis, chinensis, japonicus, and merguiensis. The optimum waste outflow rate from the aquatic specie subsystem may be selected to remove waste products from an aquatic specie density of from 0.25 to 0.5 pounds per gallon of saltwater.

The step of filtering a waste outflow from the aquatic specie subsystem may comprise a filtration subsystem for pumping the waste flow and filtering the waste flow through a mechanical filter, and a biofilter for providing a saltwater return. The step of controlling the aquaculture system may comprise connecting measurements from the algae subsystem, artemia subsystem and aquatic specie subsystem to an input multiplexer, connecting an output from the input multiplexer to an input of a microprocessor, connecting an output of the microprocessor to a controller output, connecting an output from the output controller to controls for the algae subsystem, the artemia subsystem, the aquatic specie subsystem, and the filtration subsystem, and connecting the microprocessor to a video monitor and keyboard for providing a user interface. The aquaculture system may comprise a closed recirculating system. The harvested adult aquatic specie may be shrimp.

In another embodiment of the present invention, a method for producing adult aquatic specie in an aquaculture system comprises growing algae in saltwater, feeding the algae to artemia in saltwater, producing artemia by the artemia in saltwater, feeding the algae and the artemia to an immature aquatic specie in saltwater to produce adult aquatic specie, and harvesting the adult aquatic specie from the saltwater when mature. The step of growing algae may comprise illuminating the algae in the saltwater by a light source, controlling a temperature of the algae in the saltwater by a heat source, regulating a CO2 inflow to control pH of the saltwater, replenishing saltwater lost due to evaporation and leakage, regulating a saltwater return inflow for controlling algae outflow, and measuring pH, algae density, temperature, light output, dissolved oxygen and micronutrients. The step of feeding the algae to artemia in saltwater may comprise providing an inflow of algae and saltwater into the artemia in saltwater, controlling a temperature of the algae and artemia in saltwater by a heat source, regulating an oxygen inflow to control dissolved oxygen, regulating a saltwater return inflow for controlling artemia, algae, waste and saltwater outflow, and measuring pH, algae density, temperature, ammonia, dissolved oxygen, waste, and artemia density. The step of producing artemia by the artemia in saltwater may comprise consuming algae by the artemia to generate artemia filtering the algae, artemia, waste and saltwater through a screen that allows the algae, smaller artemia, waste and saltwater to pass as an outflow while restraining the larger artemia. The step of feeding the algae and the artemia to an immature aquatic specie in saltwater to produce adult aquatic specie may comprise providing an inflow of algae, artemia, waste and saltwater to the immature aquatic specie in saltwater, controlling a temperature of the algae, artemia, waste and saltwater by a heat source, regulating an oxygen inflow to control dissolved oxygen, regulating a saltwater return inflow for controlling artemia, algae, waste and saltwater outflow, measuring aquatic specie density, aquatic specie size, pH, algae density, temperature, ammonia, dissolved oxygen, waste, volume and artemia density, consuming artemia by the immature aquatic specie to produce adult aquatic specie, and filtering the algae, aquatic specie, artemia, waste and saltwater through a graded screen that allows the algae, smaller artemia, waste and saltwater to pass as an outflow to a filtration means while restraining the aquatic specie.

In yet another embodiment of the present invention, an aquaculture system for producing adult aquatic specie comprises an algae subsystem containing saltwater illuminated by a light source for growing algae, means for flowing the algae from the algae subsystem into an artemia subsystem and an aquatic specie subsystem, both containing saltwater, the artemia subsystem containing adult artemia for consuming the algae and producing artemia, means for passing the artemia from the artemia subsystem to the aquatic specie subsystem, the aquatic specie subsystem containing an immature aquatic specie for consuming the algae and the artemia for producing an adult aquatic specie, and means for harvesting the adult aquatic specie. The system may further comprise a filtration subsystem for filtering a waste outflow from the aquatic specie subsystem and for providing a saltwater return to the algae subsystem, the artemia subsystem, and the aquatic specie subsystem. The system may further comprise a data acquisition and control subsystem for controlling the aquaculture system. The system may further comprise means for replenishing saltwater lost in the aquaculture system due to evaporation and leakage. The algae subsystem containing saltwater illuminated by a light source for growing algae may further comprise a heater for controlling a temperature of the algae subsystem, a CO2 inflow for controlling pH of the algae subsystem, a saltwater replenishment inflow for replacing saltwater lost to evaporation and leakage, a saltwater return inflow from a filtration subsystem, an algae outflow to the artemia subsystem, and measurement means for measuring pH, algae density, temperature, light output, dissolved oxygen, and micronutrients of the algae subsystem. The artemia subsystem containing adult artemia for consuming the algae and producing artemia may further comprise a heater for controlling temperature of the artemia subsystem, an oxygen inflow for controlling dissolved oxygen of the artemia subsystem, a saltwater replenishment inflow for replacing saltwater lost to evaporation and leakage, a saltwater return inflow from a filtration subsystem, a filter screen for separating the smaller artemia and waste from the adult artemia, an artemia outflow to the aquatic specie subsystem, and measurement means for measuring pH, algae density, temperature, ammonia, dissolved oxygen, waste, and artemia density of the algae subsystem. The aquatic specie subsystem containing an immature aquatic specie for consuming the algae and the artemia for producing an adult aquatic specie may further comprise a heater for controlling temperature of the aquatic specie subsystem, an oxygen inflow for controlling dissolved oxygen of the aquatic specie subsystem, a saltwater replenishment inflow for replacing saltwater lost to evaporation and leakage, a saltwater return inflow from a filtration subsystem, a graded filter screen for separating the aquatic specie from the waste algae and smaller artemia, a waste outflow to the filtration subsystem, and measurement means for measuring aquatic specie density, aquatic specie size, pH, algae density, temperature, ammonia, dissolved oxygen, waste, and volume of the algae subsystem. The graded filter screen may be selected from the group consisting of a planar filter screen and a cylindrical filter screen. The filtration subsystem may comprise a waste inflow from the aquatic specie subsystem connected to an inlet of a pump, an outlet of the pump connected to an input of a mechanical filter, an output of the mechanical filter connected to an input of a biofilter, and an output of the biofilter connected to saltwater return inflows of the algae subsystem, the artemia subsystem, and the aquatic specie subsystem. The data acquisition and control subsystem for controlling the aquaculture system may comprise an input multiplexer for accepting measurement inputs from the algae subsystem, the artemia subsystem and the aquatic specie subsystem, a microprocessor connected to an output of the input multiplexer, a monitor and keyboard user interface, and an input to an output controller, and control outputs of the output controller connected to the algae subsystem, the artemia subsystem, the aquatic specie subsystem, and the filtration subsystem. The measurement inputs may comprise pH, algae density, temperature, light output, dissolved oxygen and micronutrients from the algae subsystem, pH, algae density, temperature, ammonia, dissolved oxygen, waste, and artemia density from the artemia subsystem, and aquatic specie density, aquatic specie size, pH, algae density, temperature, ammonia, dissolved oxygen, waste, volume, and artemia density from the aquatic specie subsystem. The control outputs may comprise heater control, CO2 inflow, saltwater replenishment inflow, algae outflow, saltwater return inflow, and algae tank flow valves to the algae subsystem, heater control, oxygen inflow, artemia outflow, saltwater return inflow, algae inflow, and saltwater replenishment inflow to the artemia subsystem, heater control, oxygen inflow, waste outflow, saltwater return inflow, inflow, and saltwater return inflow to the aquatic specie subsystem, and pump speed control to the filtration subsystem.

BRIEF DESCRIPTION OF DRAWINGS

These and other features, aspects and advantages of the present invention will become better understood with regard to the following description, appended claims, and accompanying drawings wherein:

FIG. 2 shows an algae subsystem for use in a concentric aquaculture system;

FIG. 3 shows an artemia subsystem for use in a concentric aquaculture system;

FIG. 4 shows an aquatic specie subsystem for use in a concentric aquaculture system;

DETAILED DESCRIPTION

Figure 1:
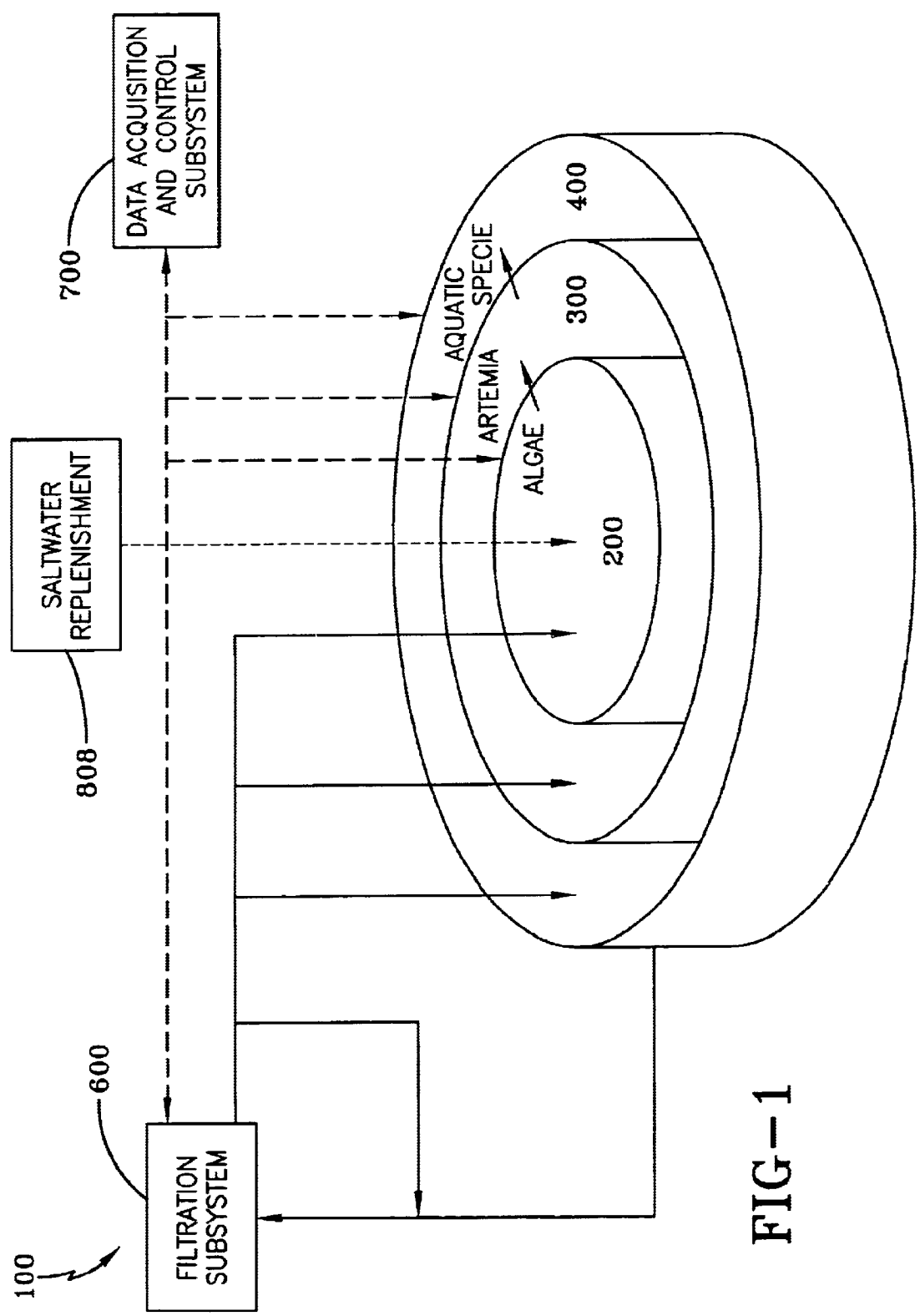
FIG. 1 shows a concentric aquaculture system according to the present invention.

Turning now to FIG. 1, FIG. 1 shows a concentric aquaculture system 100 according to the present invention. The concentric system 100 comprises an algae subsystem 200, an artemia subsystem 300, an aquatic specie subsystem 400, a filtration subsystem 600, a data acquisition and control subsystem 700, and a saltwater replenishment source 808. Algae are grown in the algae subsystem 200, and flow to the artemia subsystem 300 and the aquatic specie subsystem 400. Adult artemia in the artemia subsystem 300 feed on the algae and produce artemia larvae (live nauplii), which flow to the aquatic species subsystem 400. The aquatic specie to be produced by the system 100 is introduced into the aquatic specie subsystem 400 at an immature stage, to be raised to an adult stage for harvesting. These immature species are contained in aquatic specie subsystem 400 and feed on the algae and artemia in the aquatic specie subsystem 400. Although the algae reduces the affect of waste products from the artemia and aquatic specie, the system 100 utilizes a unique filtration subsystem 600 that removes additional waste from the system during growth of the aquatic specie being produced. The data acquisition and control subsystem 700 is critical for maintaining a suitable environment for the algae, artemia, and aquatic specie being produced by automatically monitoring and regulating a number of critical environmental parameters. A source for saltwater replenishment 808 is provided to the algae subsystem 200 for replacing saltwater lost from evaporation and leakage. As noted above, although the method and system of the present invention may be used to produce a variety of aquatic species, the preferred embodiments disclose the production of shrimp.

Turning now to FIG. 2, FIG. 2 shows an algae subsystem 200 for use in a concentric aquaculture system 100. The algae subsystem 200 uses an enclosed tank 210, preferably of fiberglass construction, that contains saltwater and algae 218. The saltwater has a salinity of from 30 to 35 parts per thousand. Lighting 214 provides energy for proper algae growth and a heater 216 maintains a temperature of the saltwater and algae 218 within an acceptable range. Sensors within the tank 210 connected to the data acquisition and monitoring subsystem 700 provide continuous monitoring of pH 226, algae density 228, temperature 230, light output 234, micronutrients 236 and dissolved oxygen 232. Since algae growth naturally causes the pH of the algae subsystem 200 to increase, controlled amounts of carbon dioxide gas ($CO_2$) 224 is introduced into the system to maintain the pH 226 within acceptable levels. The algae will gravity feed 222 from the algae subsystem 200 to the artemia subsystem 300, depending on a saltwater return rate 220 from the filtration subsystem 600 for controlling the saltwater level 212 in the tank 210. Saltwater replenishment 208 having a salinity of from 30 to 35 parts per thousand is provided to replace saltwater losses, such as evaporation and leakage. An optimal saltwater return rate 220 will keep the algae density 228 at approximately one to ten million cells per milliliter for the preferred strain of algae (tajitian strain of isochrysis galbana).

Turning now to FIG. 3, FIG. 3 shows an artemia subsystem 300 for use in a concentric aquaculture system 100. The artemia subsystem 300 utilizes an enclosed round tank 310, preferably of fiberglass construction, which contains the algae subsystem 200, saltwater and artemia 360. Sensors continuously monitor artemia density 334, temperature 330, pH 326, ammonia 338, algae density 340, waste 342 and dissolved oxygen 332 within the artemia subsystem 300. Overlapping lighting from the algae subsystem 200 allows continued growth of the algae 318 fed to the artemia 360 in the artemia subsystem 300. Although waste from the artemia 360 causes the pH of the artemia subsystem 300 to decrease, the presence of the algae 318 will increase the pH, thereby stabilizing the pH of the artemia subsystem 300. The algae 318 also serve as food for the artemia 360. A heater 316 controlled by the data acquisition and control subsystem 700 maintains the temperature of the artemia subsystem 300 within an acceptable range. The adult artemia 360 produce small artemia on a continuous basis. A 400-micron screen 314 prevents the adult artemia 360 from leaving the artemia subsystem 300, but allows the artemia waste and small artemia to pass from the artemia subsystem 300 to the aquatic specie subsystem 400 by gravity feed. The flow rate to the aquatic specie subsystem 322 will depend on the return flow rate 320 from the filtration subsystem 600 and the flow rate 222 from the algae subsystem 200. An optimal flow rate 322 to the aquatic specie subsystem 400 adequately removes waste from the artemia subsystem 300 and also provides sufficient artemia 360 to the aquatic specie subsystem 400 for food. A flow of oxygen 344 is introduced into the artemia subsystem 300 for controlling the level of dissolved oxygen. The saltwater level 312 in the artemia subsystem 300 is determined by the return flow rate 320 from the filtration subsystem 600 and the algae subsystem 220. The preferred artemia species 360 originate from the Great Salt Lake in Utah, USA.

Turning now to FIG. 4, FIG. 4 shows an aquatic specie subsystem 400 for use in a concentric aquaculture system 100. The aquatic specie subsystem 400 utilizes an enclosed round tank 410, preferably of fiberglass construction, which contains the algae subsystem 200 and the artemia subsystem 300 within it. The aquatic specie subsystem 400 also contains aquatic specie 468, preferably shrimp, algae 418, saltwater, and artemia 462. Sensors continuously monitor artemia density 434, aquatic specie size 440, aquatic specie density 442, temperature 430, pH 426, dissolved oxygen 432, algae density 444, waste 446, volume 448 and ammonia 438. Habitat structures 414 are positioned in the aquatic species subsystem 400 for. providing a greater habitat surface area for increasing the amount of aquatic species within the subsystem. The artemia 462 are food for the aquatic specie 468. A heater 416 maintains the temperature of the aquatic specie subsystem 400 within an acceptable-range. A graded screen 500, preferably nylon material, provides filtration of aquatic specie waste products and allows waste flow 422 to the filter subsystem 600. The aquatic specie subsystem 400 is initially stocked with live, commercially available postlarvae shrimp in salt water maintained at a low level. As the shrimp grow from about 0.5 inches in length to about 5 inches in length, the system 100 automatically adds saltwater to the aquatic specie subsystem 400 to gradually increase the saltwater level 412 and effective volume of the aquatic specie subsystem 400. As the saltwater level 412 of the aquatic subsystem 400 increases and the shrimp 468 grow in size, larger screen openings of the graded screen 500 allow passage of larger waste particles while preventing the shrimp 468 from passing through the graded screen. The method of slowly increasing the level of the saltwater 412 and the effective volume of the aquatic specie subsystem 400 has an additional beneficial feature. When the shrimp 468 are small, the effective volume of the aquatic specie subsystem 400 is also small, allowing a higher and more beneficial concentration of food. As the shrimp grow larger, the increase in effective volume maintains an optimum food density and optimum shrimp separation. Waste products pass through the graded screen 500 and on to the filter subsystem 700. Since the aquaculture system 100 is a closed system, the flow rate 422 to the filtration subsystem 600 will depend on the return flow rate 420 from the filtration subsystem 600 and the flow rate 322 from the artemia subsystem 300. An optimum flow rate will adequately remove waste products from the aquatic specie subsystem 400 at a density of 0.25 to 0.5 pounds of shrimp per gallon of saltwater. The preferred shrimp species is Litopenaeus Vannamei (Pacific White Shrimp).

Figure 5B:
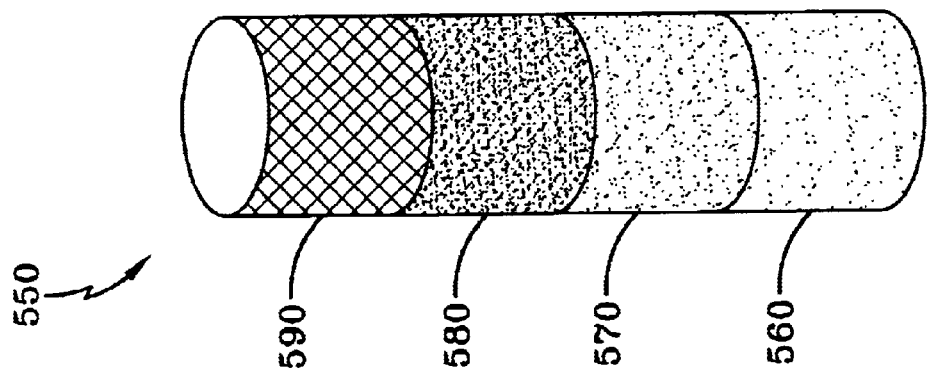
FIG. 5A and FIG. 5B show graded filter screens for use in an aquatic specie subsystem of aquaculture systems.
Figure 5A:
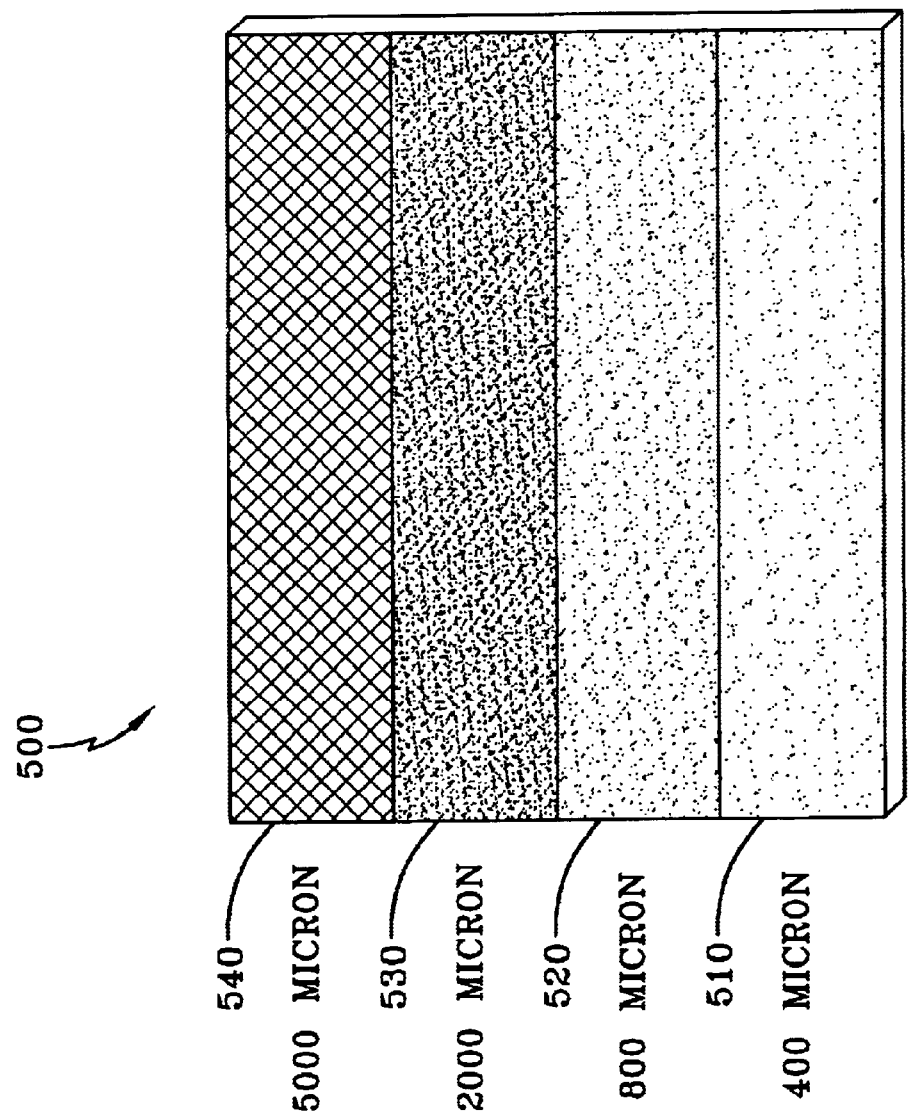

Turning now to FIG. 5A, FIG. 5A shows a planar graded filter screen 500 for use in an aquatic specie subsystem 400 of a concentric aquaculture system 100. FIG. 5A depicts one embodiment of a graded screen 500 having four distinct screens, each having a distinct mesh size. In alternative embodiments of the graded filter screen 500, there may also be a multitude of distinct screen mesh sizes, or a continuous gradient of mesh sizes. The lowest of the four distinct screens 510 comprises a screen having a mesh size of about 400 microns. The height of the lower screen 510 corresponds to a saltwater level 412 for aquatic specie inhabiting the aquatic specie subsystem 400 for between 0 and 2 weeks. The second screen 520 comprises a screen having a mesh size of about 800 microns. The height of the second screen 520 corresponds to a saltwater level 412 for aquatic specie inhabiting the aquatic specie subsystem 400 for between 2 and 4 weeks. The third screen 530 comprises a screen having a mesh size of about 2000 microns. The height of the third screen 530 corresponds to a saltwater level 412 for aquatic specie inhabiting the aquatic specie subsystem 400 for between 5 and 8 weeks. The fourth or top screen 540 comprises a screen having a mesh size of about 5000 microns. The height of the top screen 540 corresponds to a saltwater level 412 for aquatic specie inhabiting the aquatic specie subsystem 400 for between 9 and 13 weeks.

Turning now to FIG. 5B, FIG. 5B shows a cylindrical graded filter screen 550 for use in an aquatic specie subsystem 500 of a distributed aquaculture system 800. FIG. 5B depicts one embodiment of a graded screen 550 having four distinct screens, each having a distinct mesh size. In alternative embodiments of the graded filter screen 550, there may also be a multitude of distinct screen mesh sizes, or a continuous gradient of mesh sizes. The lowest of the four distinct screens 560 comprises a screen having a mesh size of about 400 microns. The height of the lower screen 560 corresponds to a saltwater level in the aquatic specie subsystem 1100 for aquatic specie inhabiting the aquatic specie subsystem 1100 for between 0 and 2 weeks. The second screen 570 comprises a screen having a mesh size of about 800 microns. The height of the second screen 570 corresponds to a saltwater level for aquatic specie inhabiting the aquatic specie subsystem 1100 for between 2 and 4 weeks. The third screen 580 comprises a screen having a mesh size of about 2000 microns. The height of the third screen 580 corresponds to a saltwater level for aquatic specie inhabiting the aquatic specie subsystem 1100 for between 5 and 8 weeks. The fourth or top screen 590 comprises a screen having a mesh size of about 5000 microns. The height of the top screen 590 corresponds to a saltwater level for aquatic specie inhabiting the aquatic specie subsystem 1100 for between 9 and 13 weeks.

Figure 6:
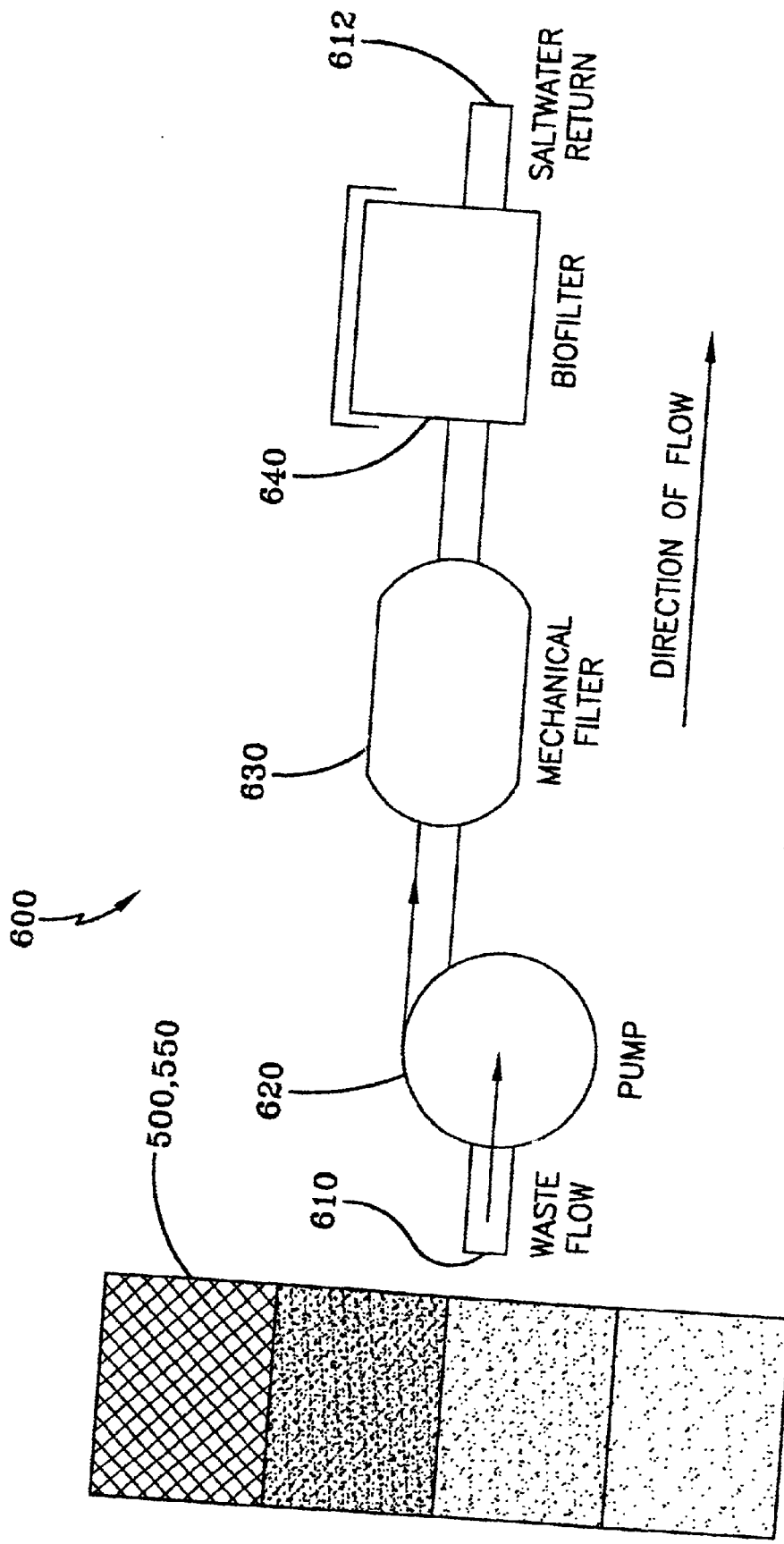
FIG. 6 shows a filtration subsystem for use in aquaculture systems.

Turning now to FIG. 6, FIG. 6 shows a filtration subsystem 600 for use in an aquaculture system 100. The input flow 610 to the filtration subsystem 600 is depicted in FIG. 1 and the output flow 612 to the algae subsystem 200, the artemia subsystem 300 and the aquatic specie subsystem 400 is explained with regard to FIG. 2–FIG. 4. The input flow 610 to the filtration system 600 is connected to the waste flow 422 from the aquatic specie subsystem 400 after passing through the graded filter screen 500. The output flow 612 from the filtration subsystem 600 is connected to the saltwater return 220 of the algae subsystem 200, the saltwater return 320 of the artemia subsystem 300 and the saltwater return 420 of the aquatic specie subsystem 400. As noted above, waste enters the input flow 610 filtration subsystem 600 from the aquatic specie subsystem 400 after passing through the graded filter screen 500. Although the algae in the system 100 will remove micronutrients from the system created by the aquatic specie waste products, additional filtration allow for higher aquatic specie densities. A saltwater pump 620 pumps the waste product stream 610, which has passed through the graded filter screen 500, through a mechanical filter 630 to remove particulate material. The mechanical filter 630 has a preferred filter size of about 100 microns, thereby trapping particulate material having a size greater than 100 microns. The waste stream is then passed through a biofilter 640 to convert ammonia into micronutrients for use as a nutrient for the algae. After filtration of the waste stream, a plumbing and valve network returns the filtered and cleansed saltwater to the algae subsystem 200, the artemia subsystem 300, the aquatic specie subsystem 400 and the filtration subsystem 600. The return flow rates to each of these subsystems, which is controlled by the data acquisition and control subsystem 700 and respective return valves, determines the flow rate through each subsystem. The data acquisition and control subsystem 700 will vary the return flow rate 220 of the algae subsystem 200 to maintain a specific algae density 228. This flow rate 220 also determines the food supply rate to the artemia. The data acquisition and control subsystem 700 also controls the return flow rate 320 of the artemia subsystem 300 to maintain an adequate supply of artemia to the aquatic specie. This flow rate 320 increases as the aquatic specie grow in size, and also determines the filtration rate of the artemia subsystem 300. The data acquisition and control subsystem 700 also controls the return flow rate 420 of the aquatic specie subsystem 400 to maintain adequate filtration of the aquatic specie subsystem 400. This flow rate 420 increases as the aquatic specie grow in size, and also affects the amount of time that the artemia stay in the aquatic specie subsystem 400. As the saltwater level 412 in the aquatic specie subsystem 400 increases, the filtration subsystem pump 620 operates at a greater flow rate because of reduced head pressure. The data acquisition and control subsystem 700 controls the filtration subsystem return flow rate 612 to maintain optimal flow rates to the other subsystems.

Figure 7:
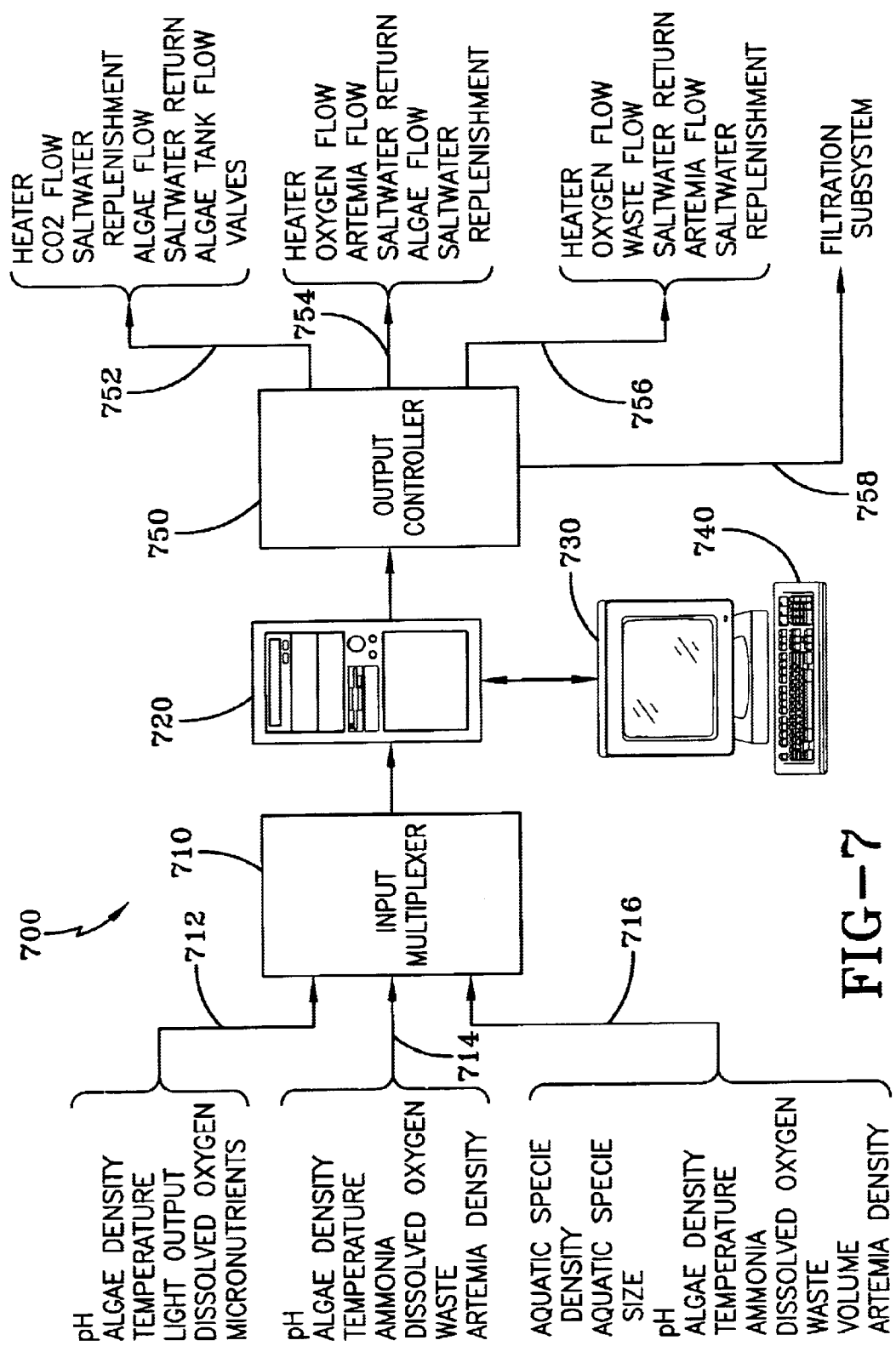
FIG. 7 shows a data acquisition and control subsystem for use in aquaculture systems.

Turning now to FIG. 7, FIG. 7 shows a data acquisition and control subsystem 700 for use in an aquaculture system 100, 800. The data acquisition and control subsystem 700 uses sensors to monitor and devices to control critical parameters of the aquaculture system 100, 800, enabling the system to sustain algae and artemia cultures while promoting rapid aquatic specie growth. A microprocessor-based system uses predetermined algorithms to maintain these critical parameters without operator intervention. The data acquisition and control subsystem 700 also records and transmits system measurements and control events to a user interface for review and analysis by an operator. The data acquisition and control subsystem 700 contains an input multiplexer 710, a microprocessor 720, an output controller 750 and a video monitor 730 and keyboard 740 for providing a user interface.

Input signals 712 from the algae subsystem 200, 900 are connected to the input multiplexer 710, where they may be sequentially selected, converted to a digital format, and sent to a microprocessor 720. The input signals 712 from the algae subsystem 200, 900 include pH 226, 926, temperature 230, 930, algae density 228, 928, light output 234, 934, micronutrients 236, 936, and dissolved oxygen,232, 932. Input signals 714 from the artemia subsystem 300, 1000 are also connected to the input multiplexer 710, where they may be sequentially selected, converted to a digital format, and sent to a microprocessor 720. The input signals 714 from the artemia subsystem 300, 1000 include pH 326, 1026, temperature 330, 1030, algae density 340, 1040, artemia density 334, 1034, waste 342, 1042, ammonia 338, 1038 and dissolved oxygen 332, 1032. Input signals 716 from the aquatic specie subsystem 400, 1100 are also connected to the input multiplexer 710 where they may be sequentially selected, converted to a digital format, and sent to a microprocessor 720. The input signals 716 from the aquatic specie subsystem 400, 1100 include pH 426, 1126, temperature 430, 1130, algae density 444, 1144, artemia density 434, 1134, aquatic specie density 440, 1140, waste 446, 1146, ammonia 438, 1138, dissolved oxygen 432, 1132, aquatic specie size 440, 1140, and volume 448, 1148.

Output signals 752 to the algae subsystem 200 900 are connected to the output controller 750 of the data acquisition and control subsystem 700, which is controlled by the microprocessor 750. For the distributed aquaculture system 800, the output signals 752 to the algae subsystem 900 include selection of one of the plurality of algae tanks. The output signals 752 to the algae subsystem 200, 900 include CO2 flow control 224, 924 for controlling pH, heater control 216, 916 for controlling temperature, and saltwater return flow rate 220, 920 for controlling algae density. In the distributed aquaculture system 800, control of CO2 flow 924 involves controlling valve 960, control of saltwater return rate 920 and algae flow rate 922 involves controlling valves 962, 964, and 966, and control of saltwater replenishment 908 involves control of valve 968. Output signals 754 to the artemia subsystem 300, 1000 are also connected to the output controller 750 for control by the microprocessor 750. The output signals 754 to the artemia subsystem 300, 1000 include saltwater return flow rate 320, 1020 for controlling pH, heater control 316, 1016 for controlling temperature, and oxygen flow control 344, 1044 for controlling dissolved oxygen. In the distributed aquaculture system 800, control the saltwater return flow 1020 involves controlling valve 1021, control of oxygen flow 1044 involves controlling valve 1043, control of saltwater replenishment 1008 involves controlling valve 1068, and control of algae flow 1024 involves controlling valve 1023. Note that artemia feed rate in the artemia subsystem 300 is controlled by the saltwater return flow rate 220 of the algae subsystem 200 and the artemia waste removal is controlled by saltwater return flow rate 320 of the artemia subsystem 300. Output signals 756 to the aquatic specie subsystem 400, 1100 are also connected to the output controller 750 for control by the microprocessor 720. The output signals 756 to the aquatic specie subsystem 400, 1100 include heater control 416, 1116 for controlling temperature, oxygen flow control 450, 1150 for controlling dissolved oxygen, and saltwater return flow rate 420, 1120 to the aquatic specie subsystem 400, 1100 for controlling waste removal and volume. In the distributed aquaculture system 800, control of the waste flow 1142 from the aquatic specie subsystem 1100 involves controlling valve 1143, control of saltwater return 1120 involves controlling valve 1121, control of oxygen flow 1150 involves controlling valve 1151, and control of saltwater replenishment 1108 involves controlling valve 1168. Note that the pH of the aquatic specie subsystem 400 is controlled by the saltwater return flow rate 220 of the algae subsystem 200, and the aquatic specie feed rate is controlled by varying the saltwater return flow rate 320 of the artemia subsystem 300.

Figure 8:
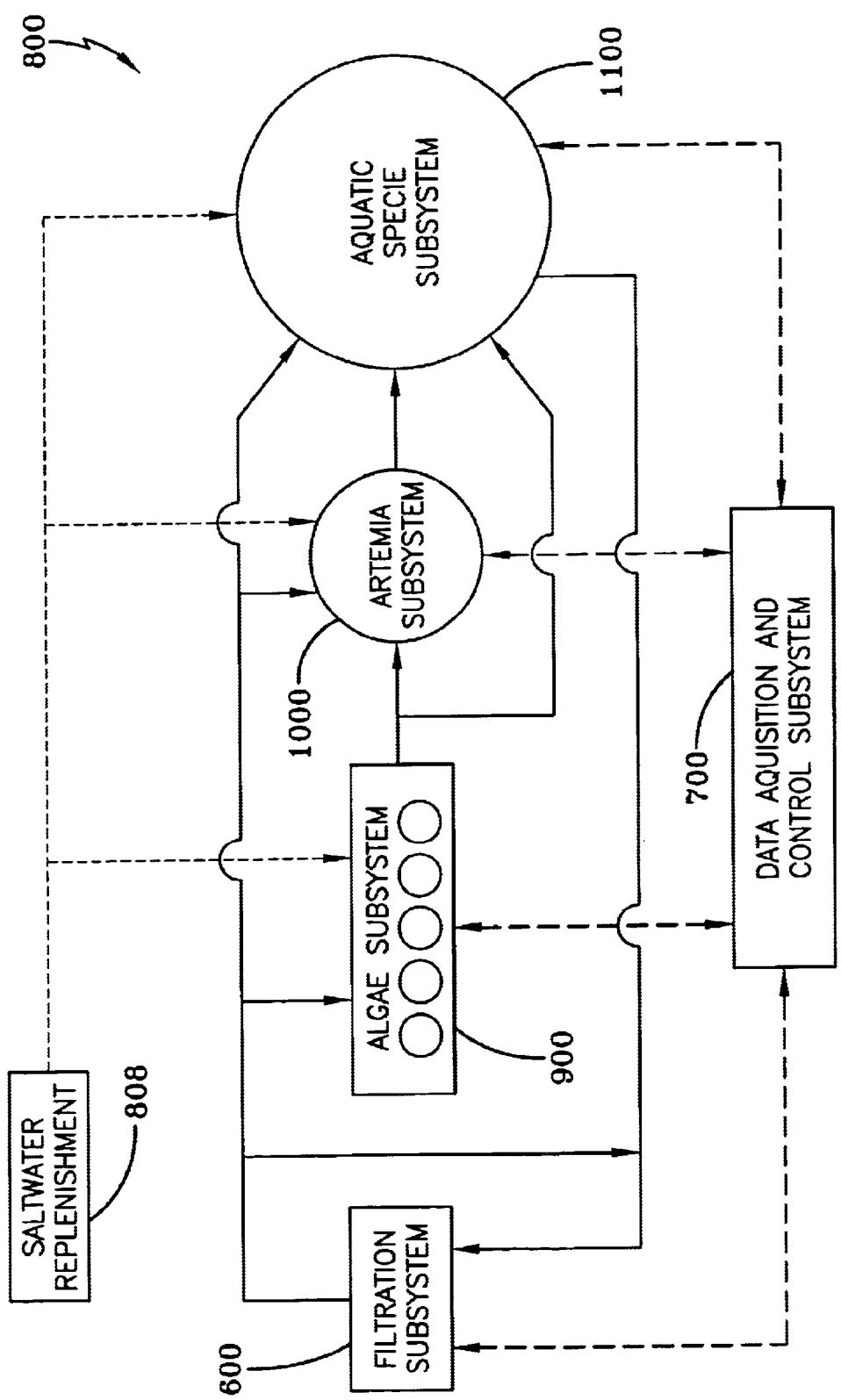
FIG. 8 shows a distributed aquaculture system according to the present invention.

Turning now to FIG. 8, FIG. 8 shows a distributed aquaculture system 800 according to the present invention. The distributed aquaculture system 800 includes a filtration subsystem 600, an algae subsystem 900, an artemia subsystem 1000, an aquatic specie subsystem 1100, a data acquisition and control subsystem 700, and a saltwater replenishment source 808. The filtration subsystem 600 is described above regarding FIG. 6, and accepts a waste stream from the aquatic specie subsystem 1100 and provides a saltwater return to the algae subsystem 900, the artemia subsystem 1000, and the aquatic specie subsystem 1100. Algae are grown in the algae subsystem 900, and flow to the artemia subsystem 1000 and the aquatic specie subsystem 1100. Adult artemia in the artemia subsystem 1000 feed on the algae and produce artemia larvae, which flow to the aquatic species subsystem 1100. The aquatic specie to be produced by the system 800 is introduced into the aquatic subsystem 1100 at an immature stage, to be raised to an adult stage for harvesting. These immature species are contained in the aquatic specie subsystem 1100 and feed on the algae and artemia larvae in the aquatic specie subsystem 1100. Although the algae reduces the affect of waste products from the artemia and aquatic specie, the system 800 utilizes a unique filtration subsystem 600 that removes additional waste from the system during growth of the aquatic specie being produced. The data acquisition and control subsystem 700 is critical for maintaining a suitable environment for the algae, artemia, and aquatic specie being produced by automatically monitoring and regulating a number of critical environmental parameters. A source for saltwater replenishment 808 is provided to the algae subsystem 900, the artemia subsystem 1000, and the aquatic specie subsystem 1100 for replacing saltwater lost from evaporation and leakage. As noted above, although the method and system of the present invention may be used to produce a variety of aquatic species, the preferred embodiments disclose the production of shrimp.

Figure 9A:
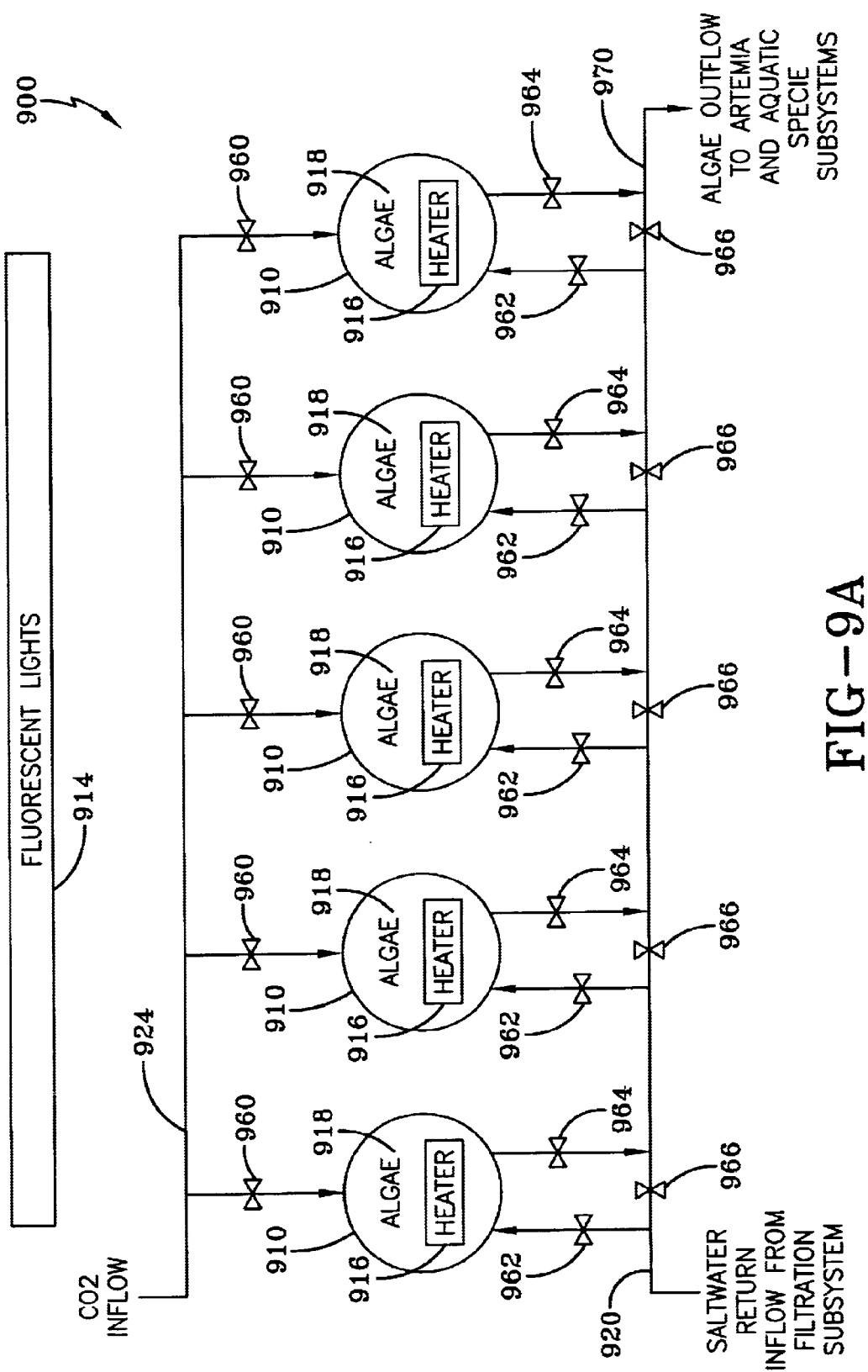
FIG. 9A and FIG. 9B show an algae subsystem for use in a distributed aquaculture system.
Figure 9B:
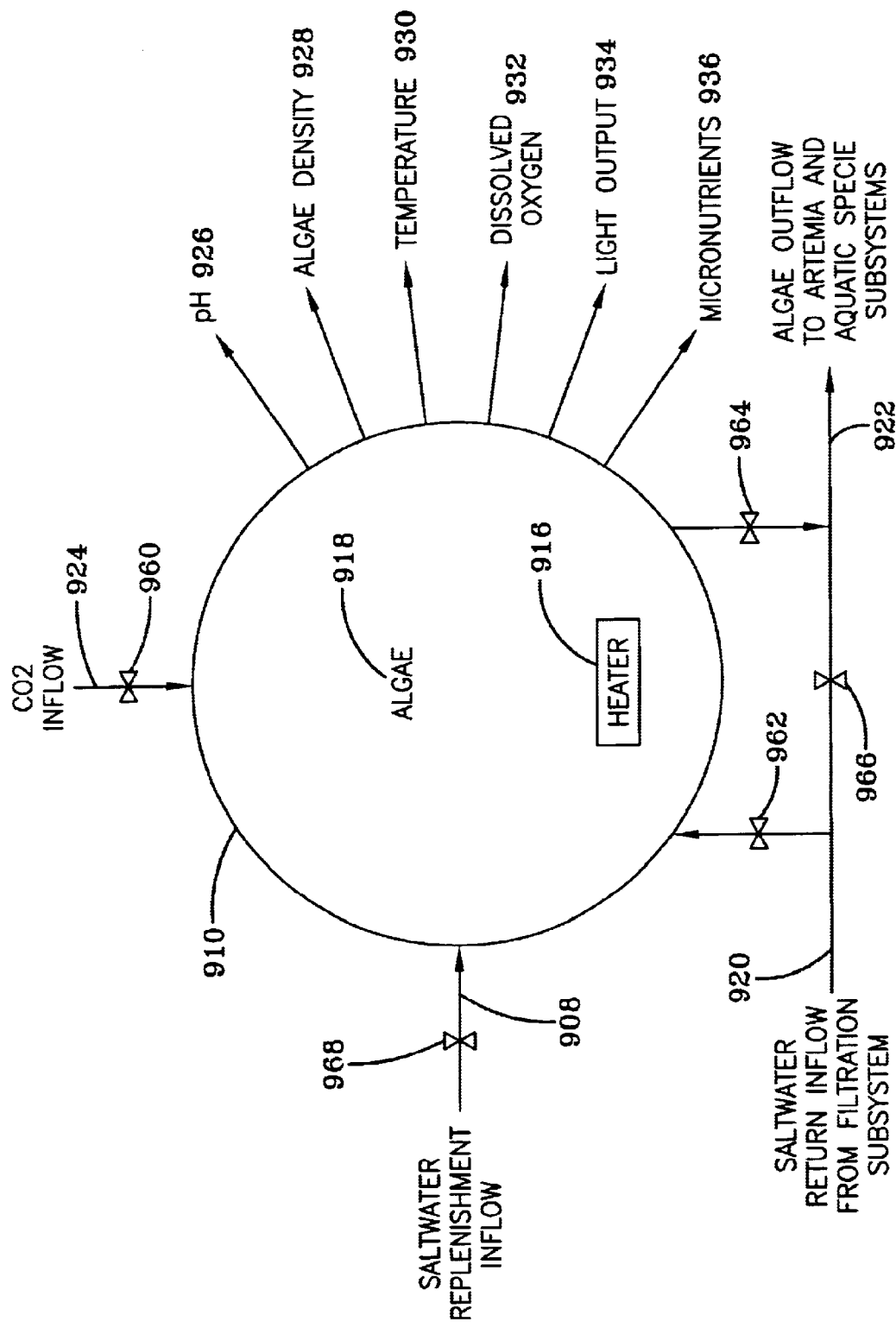

Turning now to FIG. 9A and 9B, FIG. 9A and FIG. 9B show an algae subsystem 900 for use in a distributed aquaculture system 800. The algae subsystem 900 uses a plurality of enclosed tanks 910, preferably of fiberglass construction, that contains saltwater and algae 918. FIG. 9A shows a plurality of tanks 910, and FIG. 9B shows one of the tanks in greater detail. The saltwater has a salinity of from 30 to 35 parts per thousand. Lighting 914 provides energy for proper algae growth and heaters 916 maintain a temperature of the saltwater and algae 918 within acceptable levels. Sensors within each tank 910 connected to the data acquisition and monitoring subsystem 700 provide continuous monitoring of pH 926, algae density 928, temperature 930, light output 934, micronutrients 936 and dissolved oxygen 932. Since algae growth naturally causes the pH of the algae subsystem 900 to increase, controlled amounts of carbon dioxide gas (CO2) 924 is introduced into the system to maintain the pH within acceptable levels. The amount of CO2 gas 924 introduced into each tank 910 is determined by a control valve 960, which is controlled by the data acquisition and control subsystem 700. Each tank 910 may receive saltwater return 920 from the filtration subsystem 600 through a control valve 962, which is controlled by the data acquisition and control subsystem 700. Algae flow 922 from each tank 910 to the artemia subsystem 1000 and aquatic specie subsystem 1100 is determined by a control valve 964, which is controlled by the data acquisition and control subsystem 700. A crossover valve 966, controlled by the data acquisition and control subsystem 700 is provided for bypassing each tank 910 for the flow of saltwater return 920 or algae 922. The algae flow 922 will feed from the selected tank 910 in the algae subsystem 900 to the artemia subsystem 1000 and the aquatic specie subsystem 1100, depending on an algae outflow 970 connected to the algae outflow 922 from the algae subsystem 900. The algae outflow 970 is controlled by the data acquisition and control subsystem 700. Saltwater replenishment 908 having a salinity of 30 to 35 parts per thousand is provided through a control valve 968, controlled by the data acquisition and control subsystem 700, to replace saltwater losses, such as by evaporation and leakage. An optimal saltwater return rate 920 to each tank 910 will keep the algae density 928 at approximately one to ten million cells per milliliter for the preferred strain of algae (tajitian strain of isochrysis galbana).

Figure 10:
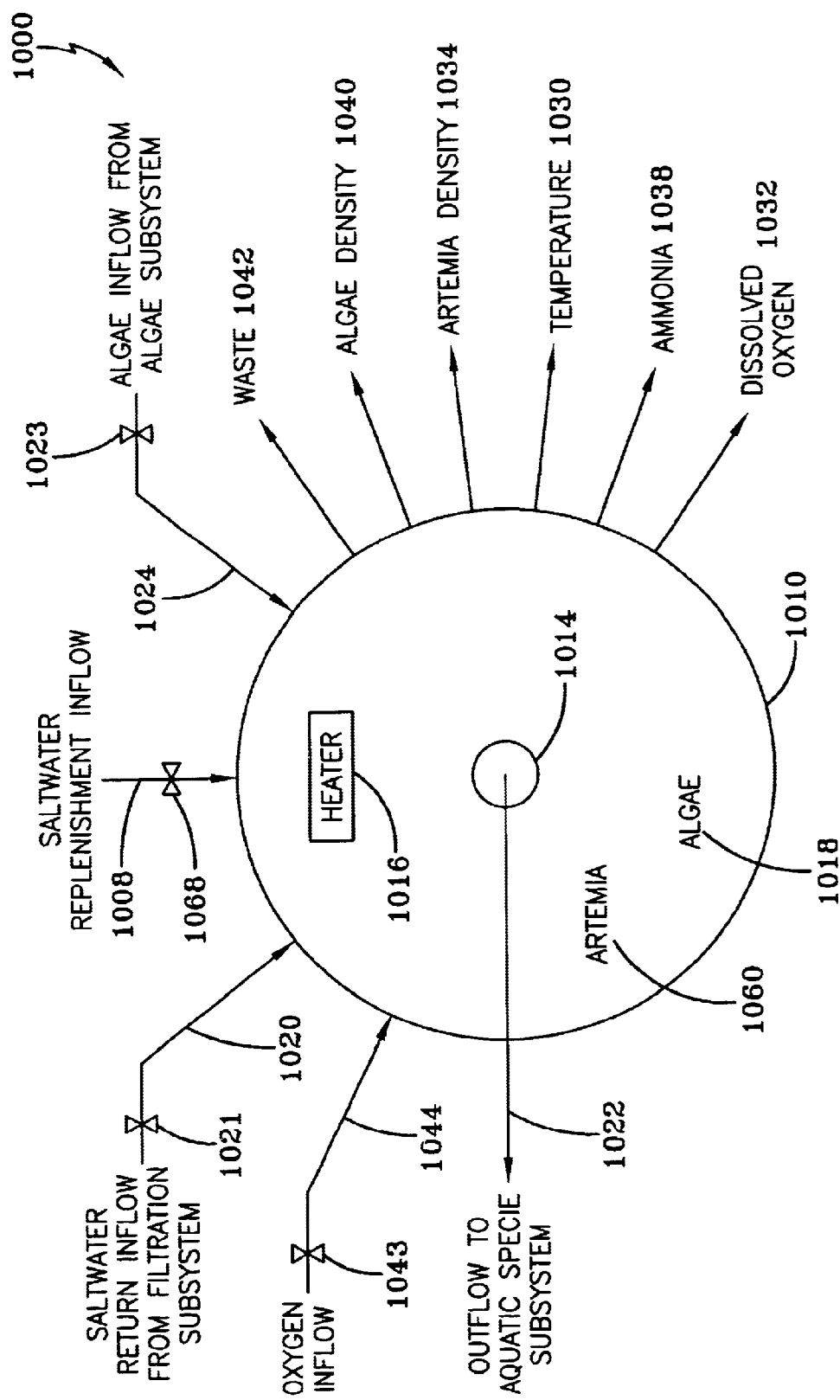
FIG. 10 shows an artemia subsystem for use in a distributed aquaculture system.

Turning now to FIG. 10, FIG. 10 shows an artemia subsystem 1000 for use in a distributed aquaculture system 800. The artemia subsystem 1000 utilizes an enclosed round tank 1010, preferably of fiberglass construction, which contains saltwater, algae 1018, and artemia 1060. Sensors continuously monitor artemia density 1034, temperature 1030, pH 1026, ammonia 1038, algae density 1040, waste 1042 and dissolved oxygen 1032 within the artemia subsystem 1000. These sensors are connected to the data acquisition and control subsystem 700. Although waste from the artemia 1060 causes the pH of the artemia subsystem 1000 to decrease, the presence of the algae 1018 will increase the pH, thereby stabilizing the pH of the artemia subsystem 1000. The algae 1018 also serve as food for the artemia 1060. A heater 1016, controlled by the data acquisition and control subsystem 700, maintains the temperature of the artemia subsystem 1000 within an acceptable range. The adult artemia 1060 produce small artemia on a continuous basis. A circular 400-micron screen 1014 prevents the adult artemia 1060 from leaving the artemia subsystem 1000 in the flow 1022 to the aquatic specie subsystem 1100, but allows the artemia waste and small artemia to pass from the artemia subsystem 1000 to the aquatic specie subsystem 1100 in the flow 1022 to the aquatic specie subsystem 1100. The flow rate to the aquatic specie subsystem 1022 will depend on the return flow rate 1020 from the filtration subsystem 600 and the flow rate 922 from the algae subsystem 900. The algae flow 1024 from the algae subsystem 900 is controlled by a valve 1023, which is controlled by the data acquisition and control subsystem 700. The saltwater return from the filtration subsystem 1020 is controlled by a valve, which is controlled by the data acquisition and control subsystem 700. An optimal flow rate to the aquatic specie subsystem 1022 adequately removes waste from the artemia subsystem 1000 and also provides sufficient artemia 1060 to the aquatic specie subsystem 1100 for food. A flow of oxygen 1044 in the form of air is introduced into the artemia subsystem 1000 for controlling the level of dissolved oxygen. The flow of oxygen is controlled by a valve 1043, which is controlled by the data acquisition and control subsystem 700. Saltwater replenishment 1008 to the artemia subsystem 1000 is controlled by a valve 1068, which is controlled by the data acquisition and control subsystem 700. The saltwater level in the artemia subsystem 1000 is determined by the return flow rate 1020 from the filtration subsystem 600 and the algae subsystem 1024. The preferred artemia species 1060 originate from the Great Salt Lake in Utah.

Figure 11:
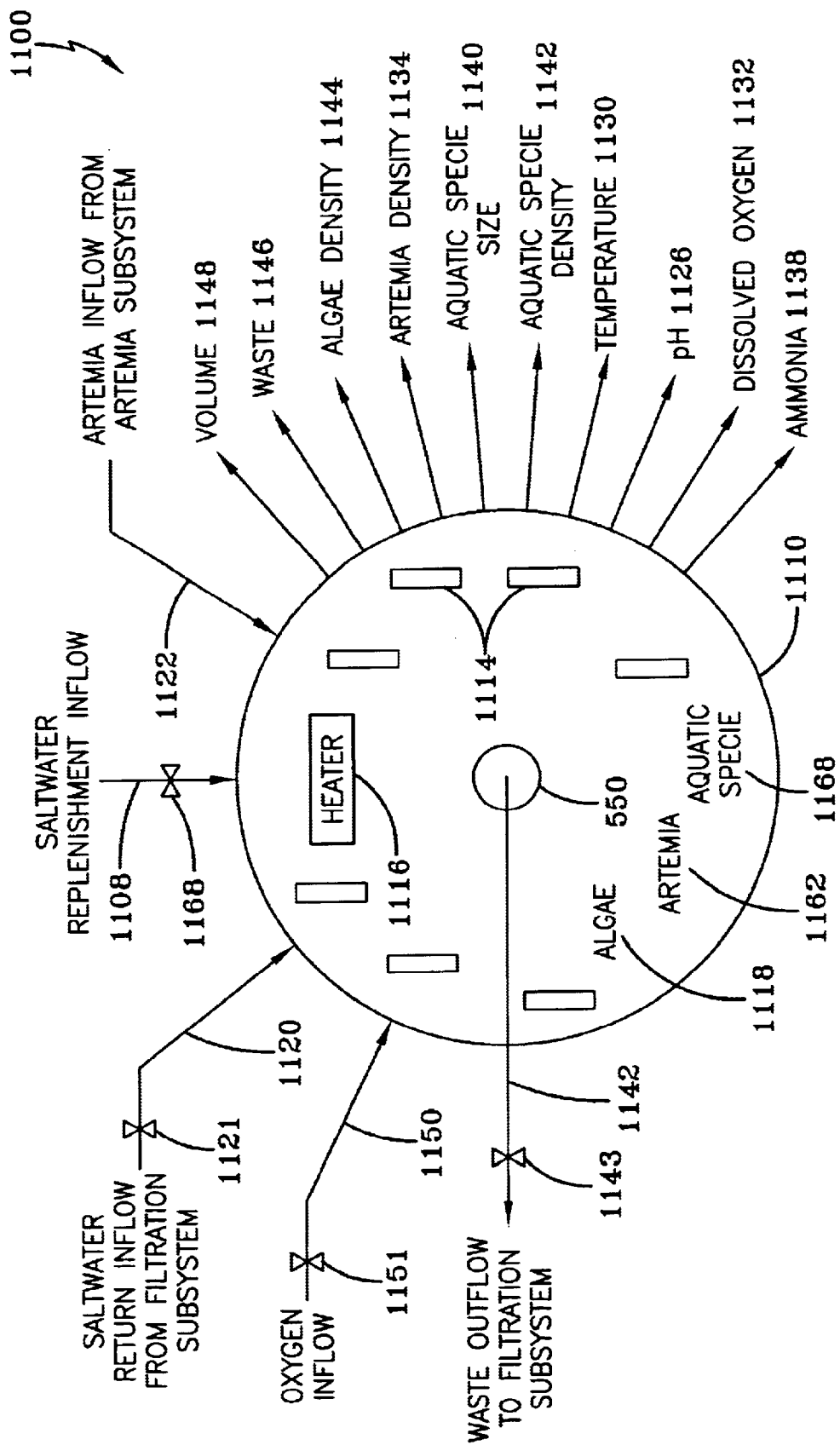
FIG. 11 shows an aquatic specie subsystem for use in a distributed aquaculture system.

Turning now to FIG. 11, FIG. 11 shows an aquatic specie subsystem 1100 for use in a distributed aquaculture system 800. The aquatic specie subsystem 1100 utilizes an enclosed round tank 1110, preferably of fiberglass construction. Habitat structures 1114 are positioned in the aquatic species subsystem 1100 for providing a greater habitat surface area for increasing the amount of aquatic species within the subsystem. The aquatic specie subsystem 1100 also contains aquatic specie 1168, preferably shrimp, algae 1118, saltwater, and artemia 1162. Sensors connected to the data acquisition and control subsystem 700 continuously monitor artemia density 1134, aquatic specie size 1140, aquatic specie density 1142, temperature 1130, pH 1126, dissolved oxygen 1132, algae density 1144, waste 1146, volume 1148 and ammonia 1138. A cover over the aquatic specie subsystem 1100 prevents light from entering the aquatic specie subsystem 1100 to maximize aquatic specie growth and density. The artemia 1162 are food for the aquatic specie 1168. A heater 1116 controlled by the data acquisition and control subsystem 700 maintains the temperature of the aquatic specie subsystem 1100 within an acceptable range. A graded screen 550, preferably nylon material, provides filtration of aquatic specie waste products and allows waste flow 1142 to the filter subsystem 600. The aquatic specie subsystem 1100 is initially stocked with live, commercially available postlarvae shrimp in salt water maintained at a low level. As the shrimp grow from about 0.5 inches in length to about 5 inches in length, the system 800 automatically adds saltwater to the aquatic specie subsystem 1100 to gradually increase the saltwater level and effective volume of the aquatic specie subsystem 1100. As the saltwater level of the aquatic specie subsystem 1100 increases and the shrimp 1168 grow in size, larger screen openings of the graded screen 550 allow passage of larger waste particles while preventing the shrimp 1168 from passing through the graded screen. The method of slowly increasing the level of the saltwater and the effective volume of the aquatic specie subsystem 1100 has an additional beneficial feature. When the shrimp 1168 are small, the effective volume of the aquatic specie subsystem 1100 is also small, allowing a higher and more beneficial concentration of food. As the shrimp 1168 grow larger, the increase in effective volume maintains an optimum food density and optimum shrimp separation. Waste products pass through the graded screen 550 and on to the filter subsystem 600. Since the aquaculture system 800 is a closed system, the flow rate 1142 to the filtration subsystem 600 will depend on the return flow rate 1120 from the filtration subsystem 600 and the flow rate 1122 from the artemia subsystem 1000. A saltwater return valve 1121, which is controlled by the data acquisition and control subsystem 700, controls the flow 1120 from the filtration subsystem 600. A waste flow valve 1143, which is controlled by the data acquisition and control subsystem 700, controls the flow 1142 to the filtration subsystem 600. An oxygen control valve 1151, which is controlled by the data acquisition and control subsystem 700, controls the flow of air 1150 to the aquatic specie subsystem 1100. A saltwater replenishment valve 1168, which is controlled by the data acquisition and control subsystem 700, controls the flow 1108 for replenishing saltwater due to evaporation and leakage. An optimum flow rate will adequately remove waste products from the aquatic specie subsystem 1100 at a density of from 0.25 to 0.5 pounds of shrimp per gallon of saltwater. The preferred shrimp species is Litopenaeus Vannamei (Pacific White Shrimp).

Although the present invention has been described in detail with reference to certain preferred embodiments, it should be apparent that modifications and adaptations to those embodiments might occur to persons skilled in the art without departing from the spirit and scope of the present invention.

What is claimed is:

1. A method for producing adult aquatic specie in an aquaculture system comprising:

growing algae within an algae subsystem containing saltwater illuminated by a light source;

flowing the algae from the algae subsystem into an artemia subsystem and an aquatic specie subsystem, both containing saltwater;

consuming the algae by adult artemia and producing small artemia by the adult artemia within the artemia subsystem;

passing the small artemia from the artemia subsystem to the aquatic specie subsystem;

consuming algae and the artemia by an immature aquatic specie for producing an adult aquatic specie within the aquatic specie subsystem; and harvesting the adult aquatic specie.

2. The method of claim 1, further comprising filtering a waste outflow from the aquatic specie subsystem by a filtration subsystem for providing a saltwater return to the algae subsystem, the artemia subsystem, and the aquatic specie subsystem.

3. The method of claim 1, further comprising controlling the aquaculture system with a data acquisition and control subsystem.

4. The method of claim 1, further comprising replenishing saltwater lost in the aquaculture system due to evaporation and leakage.

5. The method of claim 1, wherein the step of growing algae within an algae subsystem comprises:
    seeding a selected strain of algae into the algae subsystem containing saltwater;
    illuminating the algae subsystem with light for proper algae growth;
    maintaining a temperature of the algae and saltwater by a heater means;
    measuring pH, algae density, temperature, light output, dissolved oxygen and nitrates; and
    controlling CO2 inflow, saltwater replenishment inflow, saltwater return inflow from a filtration subsystem, and algae outflow to the artemia subsystem.

6. The method of claim 5, wherein the selected strain of algae is selected from the group consisting of isochrysis galbana, skeletonema, thalassiosira, phaeodactylum, chaetoceros, cylindrotheca, tetraselmis and spirulina.

7. The method of claim 5, wherein the temperature value is maintained within the range of from 27° C. to 32° C.

8. The method of claim 5, wherein controlling a CO2 inflow value maintains the pH value within a range of from 7.5 to 8.5.

9. The method of claim 5, wherein the saltwater return inflow value is selected to maintain an algae density value within a range of from 1 to 10 million cells per milliliter.

10. The method of claim 5, wherein the saltwater replenishment inflow salinity value is maintained within a range of from 30 to 35 parts per thousand.

11. The method claim 1, wherein the step of consuming algae by adult artemia and producing small artemia by the adult artemia within the artemia subsystem comprises:
    adding artemia to the artemia subsystem containing saltwater for consuming algae and producing small artemia;
    maintaining a temperature of the artemia, algae and saltwater by a heater means;
    measuring waste, algae density, artemia density, temperature, pH, ammonia, and dissolved oxygen; and
    controlling oxygen inflow, saltwater return inflow from a filtration subsystem, saltwater replenishment inflow, and artemia outflow to the aquatic specie subsystem.

12. The method of claim 11, wherein the temperature value is maintained within the range of from 27° C. to 32° C.

13. The method of claim 11, wherein controlling an oxygen inflow value maintains the dissolved oxygen value within a range of from 4.5 parts per million to 9.0 parts per million.

14. The method of claim 11, wherein controlling a saltwater return inflow value maintains an artemia outflow value to the aquatic specie subsystem to adequately remove waste from the artemia subsystem and provide sufficient artemia to the aquatic specie subsystem for food.

15. The method of claim 11, wherein the saltwater replenishment inflow salinity value is maintained within a range of from 30 to 35 parts per thousand.

16. The method of claim 11, wherein the preferred artemia specie originate from the Great Salt Lake in Utah, USA.

17. The method of claim 1, wherein the step of passing the small artemia from the artemia subsystem to an aquatic specie subsystem comprises filtering the artemia outflow from the artemia subsystem through a 400 micron screen to prevent adult artemia from leaving the artemia subsystem and allowing artemia waste and smaller artemia to pass to the aquatic specie subsystem.

18. The method of claim 1, wherein the step of consuming algae and the artemia by an immature aquatic specie comprises:
    placing the immature aquatic specie in the aquatic specie subsystem for consuming algae and artemia for producing adult aquatic specie;
    maintaining a temperature of the aquatic specie, algae, artemia and saltwater by a heater means;
    measuring volume, waste, algae density, artemia density, aquatic specie size, aquatic specie density, temperature, pH, ammonia, and dissolved oxygen; and
    controlling oxygen inflow, saltwater return inflow from a filtration subsystem, saltwater replenishment inflow, artemia inflow from the artemia subsystem, and waste outflow to the filtration subsystem.

19. The method of claim 18, wherein the step of controlling the waste outflow to the filtration subsystem comprises filtering the waste outflow from the aquatic specie subsystem through a graded screen to prevent aquatic specie from leaving the aquatic specie subsystem and allowing waste products to pass to the filtration subsystem.

20. The method of claim 19, wherein the graded filter screen comprises a 400 micron bottom section, an 800 micron lower middle section, a 2000 micron upper middle section, and a 5000 micron top section for enabling disposal of increased waste products from increasing size aquatic specie as the effective volume of the aquatic subsystem is increased by adding increasing a saltwater level to accommodate the larger specie size.

21. The method of claim 18, wherein the temperature value is maintained within the range of from 27° C. to 32° C.

22. The method of claim 18, wherein controlling an oxygen inflow value maintains the dissolved oxygen value within a range of from 4.5 parts per million to 9.0 parts per million.

23. The method of claim 18, wherein controlling a saltwater return inflow value maintains a waste outflow value to the filtration subsystem by controlling volume to adequately remove waste from the aquatic specie subsystem.

24. The method of claim 18, wherein the saltwater replenishment inflow salinity value is maintained within a range of from 30 to 35 parts per thousand.

25. The method of claim 18, wherein the preferred aquatic specie is selected from the group consisting of litopenaeus vannamei, of litopenaeus vannamei, monodon, indicus, stylirostis, chinensis, japonicus, and merguiensis.

26. The method of claim 18, wherein the optimum waste outflow rate from the aquatic specie subsystem is selected to remove waste products from an aquatic specie density of from 0.25 to 0.5 pounds per gallon of saltwater.

27. The method of claim 2, wherein the step of filtering a waste outflow from the aquatic specie subsystem comprises a filtration subsystem for pumping the waste flow and filtering the waste flow through a mechanical filter and a biofilter for providing a saltwater return.

28. The method of claim 3, wherein the step of controlling the aquaculture system comprises:

connecting measurements from the algae subsystem, artemia subsystem and aquatic specie subsystem to an input multiplexer;

connecting an output from the input multiplexer to an input of a microprocessor;

connecting an output of the microprocessor to a controller output;

connecting an output from the output controller to controls for the algae subsystem, the artemia subsystem, the aquatic specie subsystem, and the filtration subsystem; and connecting the microprocessor to a video monitor and keyboard for providing a user interface.

29. The method of claim 1, wherein the aquaculture system comprises a closed recirculating system.

30. The method of claim 1, wherein the harvested adult aquatic specie is shrimp.

31. The method of claim 1, further comprising positioning habitat structures within the aquatic specie subsystem for increasing the number of aquatic specie in the subsystem.

32. A method for producing adult aquatic specie in an aquaculture system, comprising:

growing algae in saltwater;

feeding the algae to artemia in saltwater;

producing artemia by the artemia in saltwater;

feeding the algae and the artemia to an immature aquatic specie in saltwater to produce adult aquatic specie; and harvesting the adult aquatic specie from the saltwater when mature.

33. The method of claim 32, wherein the step of growing algae comprises:

illuminating the algae in the saltwater by a light source;

controlling a temperature of the algae in the saltwater by a heat source;

regulating a CO2 inflow to control pH of the saltwater;

replenishing saltwater lost due to evaporation and leakage;

regulating a saltwater return inflow for controlling algae outflow; and measuring pH, algae density, temperature, light output, dissolved oxygen and micronutrients.

34. The method of claim 32, wherein the step of feeding the algae to artemia in saltwater comprises:

providing an inflow of algae and saltwater into the artemia in saltwater;

controlling a temperature of the algae and artemia in saltwater by a heat source;

regulating an oxygen inflow to control dissolved oxygen;

regulating a saltwater return inflow for controlling artemia, algae, waste and saltwater outflow; and measuring pH, algae density, temperature, ammonia, dissolved oxygen, waste, and artemia density.

35. The method of claim 32, wherein the step of producing artemia by the artemia in saltwater comprises:

consuming algae by the artemia to generate artemia;

filtering the algae, artemia, waste and saltwater through a screen that allows the algae, smaller artemia, waste and saltwater to pass as an outflow while restraining the larger artemia.

36. The method of claim 32, wherein the step of feeding the algae and the artemia to an immature aquatic specie in saltwater to produce adult aquatic specie comprises:

providing an inflow of algae, artemia, waste and saltwater to the immature aquatic specie in saltwater;

controlling a temperature of the algae, artemia, waste and saltwater by a heat source;

regulating an oxygen inflow to control dissolved oxygen;

regulating a saltwater return inflow for controlling artemia, algae, waste and saltwater outflow;

measuring aquatic specie density, aquatic specie size, pH, algae density, temperature, ammonia, dissolved oxygen, waste, volume and artemia density;

consuming artemia by the immature aquatic specie to produce adult aquatic specie; and filtering the algae, aquatic specie, artemia, waste and saltwater through a graded screen that allows the algae, smaller artemia, waste and saltwater to pass as an outflow to a filtration means while restraining the aquatic specie.

37. The method of claim 32, further comprising positioning habitat structures for increasing the number of aquatic specie in the subsystem.

38. An aquaculture system for producing adult aquatic specie, comprising:

an algae subsystem containing saltwater illuminated by a light source for growing algae;

means for flowing the algae from the algae subsystem into an artemia subsystem and an aquatic specie subsystem, both containing saltwater;

the artemia subsystem containing adult artemia for consuming the algae and producing artemia;

means for passing the artemia from the artemia subsystem to the aquatic specie subsystem;

the aquatic specie subsystem containing an immature aquatic specie for consuming the algae and the artemia for producing an adult aquatic specie; and means for harvesting the adult aquatic specie.

39. The system of claim 38, further comprising a filtration subsystem for filtering a waste outflow from the aquatic specie subsystem and for providing a saltwater return to the algae subsystem, the artemia subsystem, and the aquatic specie subsystem.

40. The system of claim 38, further comprising a data acquisition and control subsystem for controlling the aquaculture system.

41. The system of claim 38, further comprising means for replenishing saltwater lost in the aquaculture system due to evaporation and leakage.

42. The system of claim 38, wherein the algae subsystem containing saltwater illuminated by a light source for growing algae further comprises:

a heater for controlling a temperature of the algae subsystem;

a CO2 inflow for controlling pH of the algae subsystem;

a saltwater replenishment inflow for replacing saltwater lost to evaporation and leakage;

a saltwater return inflow from a filtration subsystem;

an algae outflow to the artemia subsystem; and measurement means for measuring pH, algae density, temperature, light output, dissolved oxygen, and micronutrients of the algae subsystem.

43. The system of claim 38, wherein the artemia subsystem containing adult artemia for consuming the algae and producing artemia further comprises:

a heater for controlling temperature of the artemia subsystem;

an oxygen inflow for controlling dissolved oxygen of the artemia subsystem;

a saltwater replenishment inflow for replacing saltwater lost to evaporation and leakage;

a saltwater return inflow from a filtration subsystem;

a filter screen for separating the smaller artemia and waste from the adult artemia;

an artemia outflow to the aquatic specie subsystem; and measurement means for measuring pH, algae density, temperature, ammonia, dissolved oxygen, waste, and artemia density of the algae subsystem.

44. The system of claim 38, wherein the aquatic specie subsystem containing an immature aquatic specie for consuming the algae and the artemia for producing an adult aquatic specie further comprises:

a heater for controlling temperature of the aquatic specie subsystem;

an oxygen inflow for controlling dissolved oxygen of the aquatic specie subsystem;

a saltwater replenishment inflow for replacing saltwater lost to evaporation and leakage;

a saltwater return inflow from a filtration subsystem;

a graded filter screen for separating the aquatic specie from the waste algae and smaller artemia;

a waste outflow to the filtration subsystem; and measurement means for measuring aquatic specie density, aquatic specie size, pH, algae density, temperature, ammonia, dissolved oxygen, waste, and volume of the algae subsystem.

45. The system of claim 44, wherein the graded filter screen is selected from the group consisting of a planar filter screen and a cylindrical filter screen.

46. The system of claim 39, wherein the filtration subsystem comprises:

a waste inflow from the aquatic specie subsystem connected to an inlet of a pump;

an outlet of the pump connected to an input of a mechanical filter;

an output of the mechanical filter connected to an input of a biofilter; and an output of the biofilter connected to saltwater return inflows of the algae subsystem, the artemia subsystem, and the aquatic specie subsystem.

47. The system of claim 40, wherein the data acquisition and control subsystem for controlling the aquaculture system comprises:

an input multiplexer for accepting measurement inputs from the algae subsystem, the artemia subsystem and the aquatic specie subsystem;

a microprocessor connected to an output of the input multiplexer, a monitor and keyboard user interface, and an input to an output controller; and control outputs of the output controller connected to the algae subsystem, the artemia subsystem, the aquatic specie subsystem, and the filtration subsystem.

48. The system of claim 47, wherein the measurement inputs comprise:

pH, algae density, temperature, light output, dissolved oxygen and micronutrients from the algae subsystem;

pH, algae density, temperature, ammonia, dissolved oxygen, waste, and artemia density from the artemia subsystem; and aquatic specie density, aquatic specie size, pH, algae density, temperature, ammonia, dissolved oxygen, waste, volume, and artemia density from the aquatic specie subsystem.

49. The system of claim 47, wherein the control outputs comprise:

heater control, CO2 inflow, saltwater replenishment inflow, algae outflow, saltwater return inflow, and algae tank flow valves to the algae subsystem;

heater control, oxygen inflow, artemia outflow, saltwater return inflow, algae inflow, and saltwater replenishment inflow to the artemia subsystem;

heater control, oxygen inflow, waste outflow, saltwater return inflow, artemia inflow, and saltwater return inflow to the aquatic specie subsystem; and pump speed control to the filtration subsystem.

50. The system of claim 38, further comprising habitat structures positioned within the aquatic specie subsystem for harvesting increased adult aquatic specie.

* * * * *